(12) United States Patent
Iyasu et al.

(10) Patent No.: US 11,201,545 B2
(45) Date of Patent: Dec. 14, 2021

(54) POWER CONVERSION SYSTEM CONTROL DEVICE AND CONTROL SYSTEM

(71) Applicant: DENSO CORPORATION, Kariya (JP)

(72) Inventors: Seiji Iyasu, Nisshin (JP); Yuichi Handa, Kariya (JP); Yuji Hayashi, Nisshin (JP); Kaoru Koketsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/854,408

(22) Filed: Apr. 21, 2020

(65) Prior Publication Data

US 2020/0251994 A1    Aug. 6, 2020

Related U.S. Application Data

(60) Division of application No. 16/504,178, filed on Jul. 5, 2019, now Pat. No. 10,848,068, which is a continuation of application No. PCT/JP2018/000852, filed on Jan. 15, 2018.

(30) Foreign Application Priority Data

Jan. 18, 2017   (JP) ................ 2017-006997
Mar. 21, 2017   (JP) ............... JP2017-055071

(51) Int. Cl.
*H02M 3/335*     (2006.01)
(52) U.S. Cl.
CPC ... *H02M 3/33507* (2013.01); *H02M 3/33576* (2013.01)
(58) Field of Classification Search
None
See application file for complete search history.

(56) References Cited

U.S. PATENT DOCUMENTS

| | | |
|---|---|---|
| 6,166,934 A | 12/2000 | Kajouke et al. |
| 7,301,313 B1 | 11/2007 | Hart et al. |
| 8,854,848 B1 | 10/2014 | Chen et al. |
| 9,233,254 B2 | 1/2016 | Nimmagadda et al. |
| 2001/0007419 A1 | 7/2001 | Tanaka |
| 2003/0048648 A1 | 3/2003 | Lin et al. |
| 2007/0248877 A1 | 10/2007 | Qahoug et al. |
| 2009/0134858 A1 | 5/2009 | Chen et al. |
| 2012/0163051 A1 | 6/2012 | Vogman |

(Continued)

FOREIGN PATENT DOCUMENTS

| | | |
|---|---|---|
| DE | 10216252 A1 | 11/2003 |
| FR | 1585102 A | 1/1970 |

(Continued)

OTHER PUBLICATIONS

Jul. 23, 2020 Notice of Allowance issued in U.S. Appl. No. 16/504,178.

*Primary Examiner* — Jeffrey A Gblende
(74) *Attorney, Agent, or Firm* — Oliff PLC

(57) ABSTRACT

A control device is applied to a power conversion system including a first power conversion device and a second power conversion device connected in parallel with a common power supply target. The control device acquires a load output including a load current or power to be supplied to the power supply target, and control operation of the first power conversion device and the second power conversion device based on at least any of a voltage parameter including any of an input voltage and an output voltage and the load output.

7 Claims, 19 Drawing Sheets

(56) References Cited

U.S. PATENT DOCUMENTS

| | | |
|---|---|---|
| 2013/0285460 A1 | 10/2013 | DeHaven |
| 2014/0271272 A1 | 9/2014 | Jeon et al. |
| 2016/0020696 A1 | 1/2016 | Shibata et al. |
| 2019/0334442 A1 | 10/2019 | Iyasu et al. |

FOREIGN PATENT DOCUMENTS

| | | |
|---|---|---|
| JP | H09-308231 A | 11/1997 |
| JP | H10-164841 A | 6/1998 |
| JP | 2012-244862 A | 12/2012 |
| JP | 2013-095246 A | 5/2013 |
| JP | 5202268 B2 | 6/2013 |

INDEPENDENT OPERATION OF SECOND DDC

INDEPENDENT OPERATION OF FIRST DDC

COOPERATIVE OPERATION

|  | FIRST DDC | SECOND DDC |
|---|---|---|
| RV1 | — | PREFERENTIAL OPERATION (Iout2≧Iout1) |
| RV2 | PREFERENTIAL OPERATION (Iout1≧Iout2) | AUXILIARY OPERATION |
| RV3 | — | PREFERENTIAL OPERATION (Iout2≧Iout1) |

|  | FIRST DDC (Ir1=150A) | SECOND DDC (Ir2=30A) |
|---|---|---|
| IL<ThL1 | — | Iout2 |
| IL≧ThL1 | Iout1 | — |

|  | FIRST DDC (Ir1=75A) | SECOND DDC (Ir2=75A) |
|---|---|---|
| IL<ThL2 | Iout1 | — |
| IL≧ThL2 | Iout1 | Iout2 |

FIG.26

|  | FIRST DDC (Ir1=120A) | SECOND DDC (Ir2=30A) |
|---|---|---|
| IL<ThL1 | — | Iout2 |
| ThL1≦IL<ThL3 | Iout1 | — |
| IL≧ThL3 | Iout1 | Iout2 |

POWER CONVERSION SYSTEM CONTROL DEVICE AND CONTROL SYSTEM

CROSS-REFERENCE TO RELATED APPLICATION

This application claims priority to U.S. application Ser. No. 16/504,178, filed on Jul. 5, 2019, and also claims priority under 35 U.S.C. 120 from International Application No. PCT/JP2018/000852 filed on Jan. 15, 2018, the entire contents of both of which are incorporated herein by reference. This application is also based on and claims the benefit of priority from Japanese Patent Application No. 2017-006997 filed on Jan. 18, 2017 and Japanese Patent Application No. 2017-055071 filed on Mar. 21, 2017, the entire contents of both of which are incorporated herein by reference.

BACKGROUND

Technical Field

The present disclosure relates to a power conversion system control device and a control system including a power conversion system and the control device.

Background Art

Conventionally, a power conversion system including multiple power conversion devices connected in parallel with a common power supply target and configured to supply power to the power supply target is known. A conventional power conversion system includes one configured to equalize an output current of each power conversion device to output the resultant current to the power supply target.

The conventional power conversion system sets, according to the rated current of a current sensor, the number of power conversion devices to be operated for output current equalization. In this power conversion system, the number of devices to be operated is set such that the total output current of the power conversion devices after equalization approaches closest to the rated current of the current sensor.

SUMMARY

The present disclosure is applied to a power conversion system including a first power conversion device and a second power conversion device connected in parallel with a common power supply target, and includes a load output acquisition unit configured to acquire at least any of a load output and a voltage parameter and an operation control unit configured to control operation of the first power conversion device and the second power conversion device based on at least any of the voltage parameter and the load output.

BRIEF DESCRIPTION OF THE DRAWINGS

The above-described object of the present disclosure and other objects, features, and advantageous effects of the present disclosure will be more apparent from the following detailed description with reference to the attached drawings. The drawings are:

FIG. 26 describes sharing amounts in a fifth embodiment;

DETAILED DESCRIPTION OF THE PREFERRED EMBODIMENTS

Figure 1:
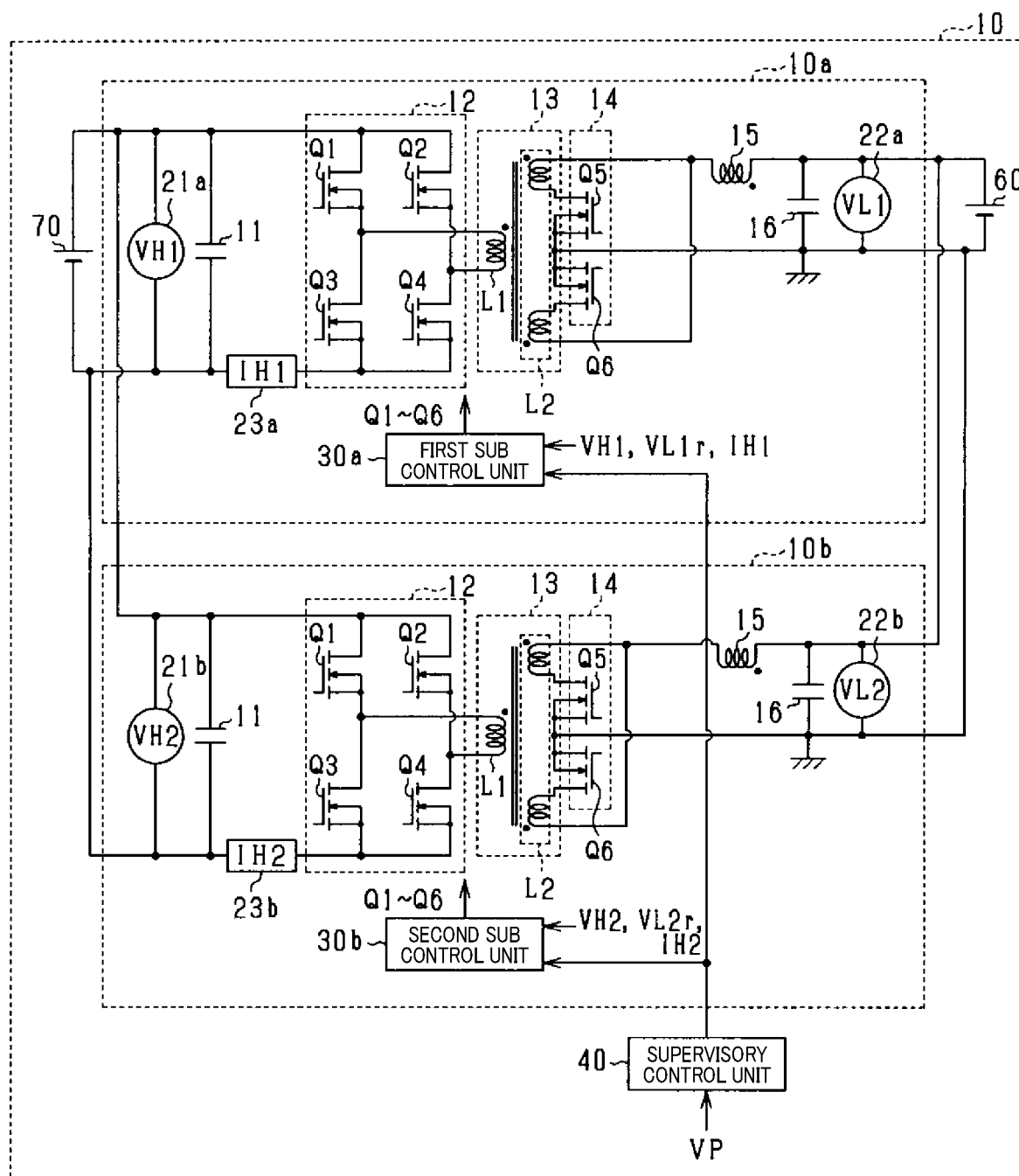
FIG. 1 is a configuration diagram of a power conversion system.

The inventor of the present disclosure has studied a power conversion system control device applied to a power conversion system including two power conversion devices connected in parallel with a common power supply target and configured so that a power conversion efficiency can be improved.

In a case where two power conversion devices having different rated values are, for example, connected in parallel with the common power supply target, a power conversion efficiency of the entirety of the power conversion system cannot be improved in some cases merely by output current equalization and simultaneous operation of the power conversion devices.

The present disclosure has been made in view of the above-described problem, and the object of the present disclosure is to provide a power conversion system control device applied to a power conversion system including two power conversion devices connected in parallel with a common power supply target and configured so that a power conversion efficiency can be improved.

For solving the above-described problem, the present disclosure is applied to a power conversion system including a first power conversion device and a second power conversion device connected in parallel with a common power supply target, and includes a load output acquisition unit configured to acquire at least any of a load output including a load current or power to be supplied to the power supply target and a voltage parameter including an input voltage or an output voltage of each of the first power conversion device and the second power conversion device and an operation control unit configured to control operation of the first power conversion device and the second power conversion device based on at least any of the voltage parameter and the load output.

In the above-described configuration, operation of the first power conversion device and the second power conversion device is controlled based on at least any of the voltage parameter and the load output influencing power conversion efficiencies of the first and second power conversion devices. In this case, the first and second power conversion devices can be efficiently operated, and a power conversion efficiency of the entirety of the power conversion system can be improved.

Specifically, the present disclosure may have the following configurations, for example. In this configuration, the second power conversion device has the maximum power conversion efficiency in a first load area. The first power conversion device has the maximum power conversion efficiency in a second load area greater than the first load area. The load output acquisition unit acquires the load output. A load determination unit configured to determine which one of the first load area, the second load area, and a third load area greater than the second load area the load output is included is provided. The operation control unit operates only the second power conversion device in a case where it is determined that the load output is in the first load area, operates only the first power conversion device in a case where it is determined that the load output is in the second load area, and operates the first power conversion device and the second power conversion device together in a case where it is determined that the load output is in the third load area.

There is a power conversion system configured such that a second power conversion device having the maximum power conversion efficiency in a first load area and a first power conversion device having the maximum power conversion efficiency in a second load area greater than the first load area are connected in parallel with a common power supply target. In this system, when the power conversion devices are simultaneously operated, a proper value of a power conversion efficiency is not provided in some cases. For this reason, in this configuration, the load output including the current or the power to be supplied to the power supply target is acquired, and it is determined which one of the first load area, the second load area, and the third load area the load output is in. Then, only the second power conversion device is operated in a case where it is determined that the load output is in the first load area, and only the first power conversion device is operated in a case where it is determined that the load output is in the second load area. In a case where it is determined that the load output is in the third load area, the first power conversion device and the second power conversion device are operated together. In this case, each of the first power conversion device and the second power conversion device is operated in the load area with a high power conversion efficiency, and therefore, the power conversion system can be operated with an optimal power conversion efficiency.

Specifically, the present disclosure may have the following configurations, for example. In this configuration, the first power conversion device is a first DC/DC converter configured to drop an input voltage from an electric storage device. The second power conversion device is a second DC/DC converter configured to drop the input voltage from the electric storage device. The load output acquisition unit acquires the load current as the load output and the voltage parameter. A sharing setting unit configured to set load current sharing amounts of the first DC/DC converter and the second DC/DC converter based on the voltage parameter and the load current is provided. The operation control unit controls, based on the sharing amounts, operation of the first DC/DC converter and the second DC/DC converter.

A power conversion system including two DC/DC converters configured to supply power to a common power supply target is assumed herein. In this power conversion system, two DC/DC converters equally have characteristics that can accept a broad input voltage range or a broad output voltage range so that fluctuation in an input voltage or an output voltage can be handled.

However, when two DC/DC converters have the characteristics that can accept the broad input voltage range or the broad output voltage range, the efficiency of the power conversion system might be sacrificed in some cases.

The efficiency of the DC/DC converter changes according to the input voltage or the output voltage and a load current. For this reason, in this configuration, the load current sharing amounts of the first DC/DC converter and the second DC/DC converter are set based on the voltage parameter including the input voltage or the output voltage and the load current. Based on the set sharing amounts, operation of the first DC/DC converter and the second DC/DC converter is controlled. In this case, the load current sharing amounts are set considering the efficiencies of the first DC/DC converter and the second DC/DC converter, and therefore, fluctuation in the input voltage or the output voltage can be handled without sacrificing the efficiency of the entirety of the power conversion system.

First Embodiment

FIG. 1 is a configuration diagram of a power conversion system 10 according to a first embodiment. The power conversion system 10 includes a first DC/DC converter (hereinafter referred to as a "first DDC 10a") and a second DC/DC converter (hereinafter referred to as a "second DDC 10b"), output sides of these converters being connected in parallel with a first storage battery 60 as a common power supply target. Specifically, the output sides of the first DDC 10a and the second DDC 10b are connected in parallel with a plus-side terminal and a minus-side terminal of the first storage battery 60. Moreover, input sides of the first DDC 10a and the second DDC 10b are connected in parallel with a second storage battery 70 as a common DC power source.

The first DDC 10a and the second DDC 10b drop DC voltage supplied from the second storage battery 70 to generate output voltage. In the present embodiment, the first storage battery 60 includes a lead storage battery. Moreover, the second storage battery 70 includes a lithium-ion storage battery. Note that various devices to be driven by DC power supplied from the power conversion system 10 may be connected to the first storage battery 60. In the present embodiment, the first DDC 10a corresponds to a first power conversion device, and the second DDC 10b corresponds to a second power conversion device.

Next, a configuration of the first DDC 10a will be described in detail. The first DDC 10a is a full-bridge DC/DC converter, and includes a smoothing capacitor 11, a first conversion circuit 12, a transformer 13, a second conversion circuit 14, a reactor 15, and a filter capacitor 16.

The smoothing capacitor 11 is connected to between a plus-side terminal and a minus-side terminal of the second storage battery 70.

The first conversion circuit 12 includes first to fourth switches Q1 to Q4, and ON/OFF of each of the switches Q1 to Q4 is switched such that DC power from the second storage battery 70 is converted into AC power and the AC power is supplied to a primary-side coil L1 of the transformer 13. In the present embodiment, each of the switches Q1 to Q4 includes a MOS-FET. The first conversion circuit 12 includes a first leg connecting a source of the first switch Q1 and a drain of the third switch Q3 in series, and a second leg connecting a source of the second switch Q2 and a drain of the fourth switch Q4 in series. The first leg and the second leg are connected in parallel with the second storage battery 70. Moreover, a connection point between the first switch Q1 and the third switch Q3 is connected to a first end of the primary-side coil L1 of the transformer 13, and a connection point between the second switch Q2 and the fourth switch Q4 is connected to a second end of the primary-side coil L1.

The transformer 13 includes a secondary-side coil L2 in addition to the primary-side coil L1. The second conversion circuit 14 is connected to the secondary-side coil L2. AC voltage is supplied from the first conversion circuit 12 to the primary-side coil L1, and accordingly, AC voltage corresponding to a turn ratio between the primary-side coil L1 and the secondary-side coil L2 is generated at the secondary-side coil L2.

The second conversion circuit 14 includes a fifth switch Q5 and a sixth switch Q6. In the present embodiment, each of the switches Q5, Q6 includes a MOS-FET. The second conversion circuit 14 switches ON/OFF of each of the switches Q5, Q6 to convert the AC voltage generated at the secondary-side coil L2 of the transformer 13 into DC voltage. Moreover, a drain of the fifth switch Q5 and a drain of the sixth switch Q6 are each connected to both ends of the secondary-side coil L2. Further, a source of the fifth switch Q5 and a source of the sixth switch Q6 are connected to each other.

A first end of the reactor 15 is connected to one end of the secondary-side coil L2, and the DC voltage converted by the second conversion circuit 14 is supplied to the reactor 15. The plus-side terminal of the first storage battery 60 is connected to a second end of the reactor 15. The minus-side terminal of the first storage battery 60 is connected to a connection point between the fifth switch Q5 and the sixth switch Q6. The filter capacitor 16 is connected in parallel with the first storage battery 60.

The first DDC 10a includes a first sub control unit 30a. The first sub control unit 30a turns on/off each of the switches Q1 to Q6 forming the first conversion circuit 12 and the second conversion circuit 14 in the first DDC 10a. Note that the first sub control unit 30a may include an integrated circuit including multiple functional blocks, for example. Each function of the first sub control unit 30a will be described later.

The first DDC 10a includes a first input voltage sensor 21a, a first output voltage sensor 22a, and a first current sensor 23a. The first input voltage sensor 21a is connected to between the second storage battery 70 and the smoothing capacitor 11, and detects, as a first input voltage VH1, voltage input from the second storage battery 70 to the first DDC 10a. The first output voltage sensor 22a is connected to between the filter capacitor 16 and the first storage battery 60, and detects the output voltage of the first DDC 10a as a first output voltage VL1r. The first current sensor 23a detects, as a first current IH1, current flowing in an electric path connecting the smoothing capacitor 11 and the first conversion circuit 12. Each of the detection values VH1, VL1r, IH1 detected by the first input voltage sensor 21a, the first output voltage sensor 22a, and the first current sensor 23a is input to the first sub control unit 30a.

Subsequently, a configuration of the second DDC 10b will be described. Note that in the present embodiment, the first and second DDCs 10a, 10b have the same basic configuration, and description of the second DDC 10b will be omitted as necessary. Moreover, reference signs common to the components of the first DDC 10a are used to represent components of the second DDC 10b.

The second DDC 10b includes a second sub control unit 30b, a second input voltage sensor 21b, a second output voltage sensor 22b, and a second current sensor 23b. The second input voltage sensor 21b detects, as a second input voltage VH2, voltage input from the second storage battery 70 to the second DDC 10b. The second output voltage sensor 22b detects the output voltage of the second DDC 10b as a second output voltage VL2r. The second current sensor 23b detects, as a second current IH2, current flowing in an electric path connecting a smoothing capacitor 11 and a first conversion circuit 12 in the second DDC 10b. Each of the detection values VH2, VL2r, IH2 detected by the second input voltage sensor 21b, the second output voltage sensor 22b, and the second current sensor 23b is input to the second sub control unit 30b.

The power conversion system 10 includes a supervisory control unit 40. The supervisory control unit 40 includes a well-known microcomputer, and is electrically connected to each of the lower control units 30a, 30b.

Next, functions of each of the lower control units 30a, 30b will be described. FIG. 2(a) illustrates the first lower control unit 30a, and FIG. 2(b) illustrates the second lower control unit 30b. The first lower control unit 30a and the second lower control unit 30b basically have the same configuration. Thus, only functional blocks of the first lower control unit 30a will be described in detail below, and description of functional blocks of the second lower control unit 30b will be omitted as necessary.

As illustrated in FIG. 2(a), the first lower control unit 30a includes a constant voltage control unit 31a, a constant current control unit 32a, a minimum value selection unit 33a, and a peak current control unit 34a. In the present embodiment, the constant voltage control unit 31*a* corresponds to a first target current calculation unit, and the minimum value selection unit 33*a* corresponds to a current value change unit.

The constant voltage control unit 31*a* calculates, as an operation amount for the control of feeding back the first output voltage VL1r to a first voltage command value VL1*, a first target current value Irefcv1 as a target value of the output current of the first DDC 10*a*. In the present embodiment, the first voltage command value VL1* is output from the supervisory control unit 40 to the first lower control unit 30*a*. Moreover, a second voltage command value VL2* is output from the supervisory control unit 40 to the second lower control unit 30*b*.

The constant voltage control unit 31*a* includes a slow changer 311, a voltage deviation calculator 312, and a PI controller 313. First, the first voltage command value VL1* is input to the slow changer 311. The slow changer 311 outputs a value obtained in such a manner that the first voltage command value VL1* is gradually changed according to a change in the first voltage command value VL1*. The voltage deviation calculator 312 subtracts the first output voltage VL1r detected by the first output voltage sensor 22*a* from the first voltage command value VL1* converted by the slow changer 311, thereby calculating a deviation. The deviation calculated by the voltage deviation calculator 312 is input to the PI controller 313. The PI controller 313 performs proportional-integral control for the input deviation, thereby calculating the first target current value Irefcv1.

The constant current control unit 32*a* calculates a first upper current value Irefcc1. In the present embodiment, the first upper current value Irefcc1 is set such that the first DDC 10*a* operates with rated current (e.g., 120 A). Specifically, the first upper current value Irefcc1 is set considering the turn ratio of the transformer, ripple current, etc.

The minimum value selection unit 33*a* compares the first target current value Irefcv1 output from the constant voltage control unit 31*a* and the first upper current value Irefcc1 output from the constant current control unit 32*a*, thereby selecting and outputting a smaller one of these values. Thus, in a case where the first target current value Irefcv1 exceeds the first upper current value Irefcc1, the minimum value selection unit 33*a* outputs the first upper current value Irefcc1 to the peak current control unit 34*a*. Of Irefcv1 and Irefcc1, the current value selected by the minimum value selection unit 33*a* will be hereinafter described as a first current command value Iref1.

The peak current control unit 34*a* includes a DA converter 341, a comparator 342, and an adder 343. First, the first current command value Iref1 selected by the minimum value selection unit 33*a* is input to the DA converter 341. The DA converter 341 converts the input first current command value Iref1 from a digital value into an analog value. The first current command value Iref1 converted into the analog value is input to an inverted input terminal of the comparator 342. The adder 343 adds up the first current IH1 and a slope compensation signal, thereby outputting the resultant value as compensated switch current. An output signal of the adder 343 is input to a non-inverted input terminal of the comparator 342. Note that the slope compensation signal is for reducing oscillation accompanied by fluctuation in current flowing in the reactor 15.

The comparator 342 compares the first current command value Iref1 and the compensated switch current, thereby inputting a signal in a low state to a R-terminal of a RS flip-flop 347 during a period in which the compensated switch current is lower than the first current command value Iref1. Moreover, the comparator 342 inputs a signal in a high state to the R-terminal of the RS flip-flop 347 during a period in which the compensated switch current is higher than the first current command value Iref1. Further, a clock signal is input to a S-terminal of the RS flip-flop 347. After an upper duty limit has been set by a duty control unit 348, the output of the RS flip-flop 347 is output as drive signals G1, G2, G3, G4 for turning on/off the first, second, third, and fourth switches Q1, Q2, Q3, Q4.

The first lower control unit 30*a* includes, as a stop control unit, a current determination unit 35*a* and an output determination unit 36*a*. The current determination unit 35*a* and the output determination unit 36*a* output, as the drive signals G1 to G4, OFF drive signals for turning off the first to fourth switches Q1 to Q4 in a case where the first current command value Iref1 selected by the minimum value selection unit 33*a* falls below such a current value that the first DDC 10*a* can be stably operated. Thus, in a case where the first current command value Iref1 is too small to stably operate the first to fourth switches Q1 to Q4, the first to fourth switches Q1 to Q4 are turned off, and operation of the first DDC 10*a* is stopped.

Specifically, the current determination unit 35*a* determines whether the first current command value Iref1 output from the minimum value selection unit 33*a* is equal to or smaller than a predetermined current value or not. In a case where the output determination unit 36*a* acquires, from the current determination unit 35*a*, a determination result showing that the first current command value Iref1 exceeds the predetermined current value, the output determination unit 36*a* directly outputs each of the drive signals G1 to G4 output from the duty control unit 348 to gates of the first to fourth switches Q1 to Q4. On the other hand, in a case where the output determination unit 36*a* acquires, from the current determination unit 35*a*, a determination result showing that the first current command value Iref1 is equal to or smaller than the predetermined current value, the output determination unit 36*a* switches all of the drive signals G1 to G4 output from the duty control unit 348 to the OFF drive signals, and outputs the OFF drive signals. Thus, operation of the first DDC 10*a* is stopped.

Figure 2:
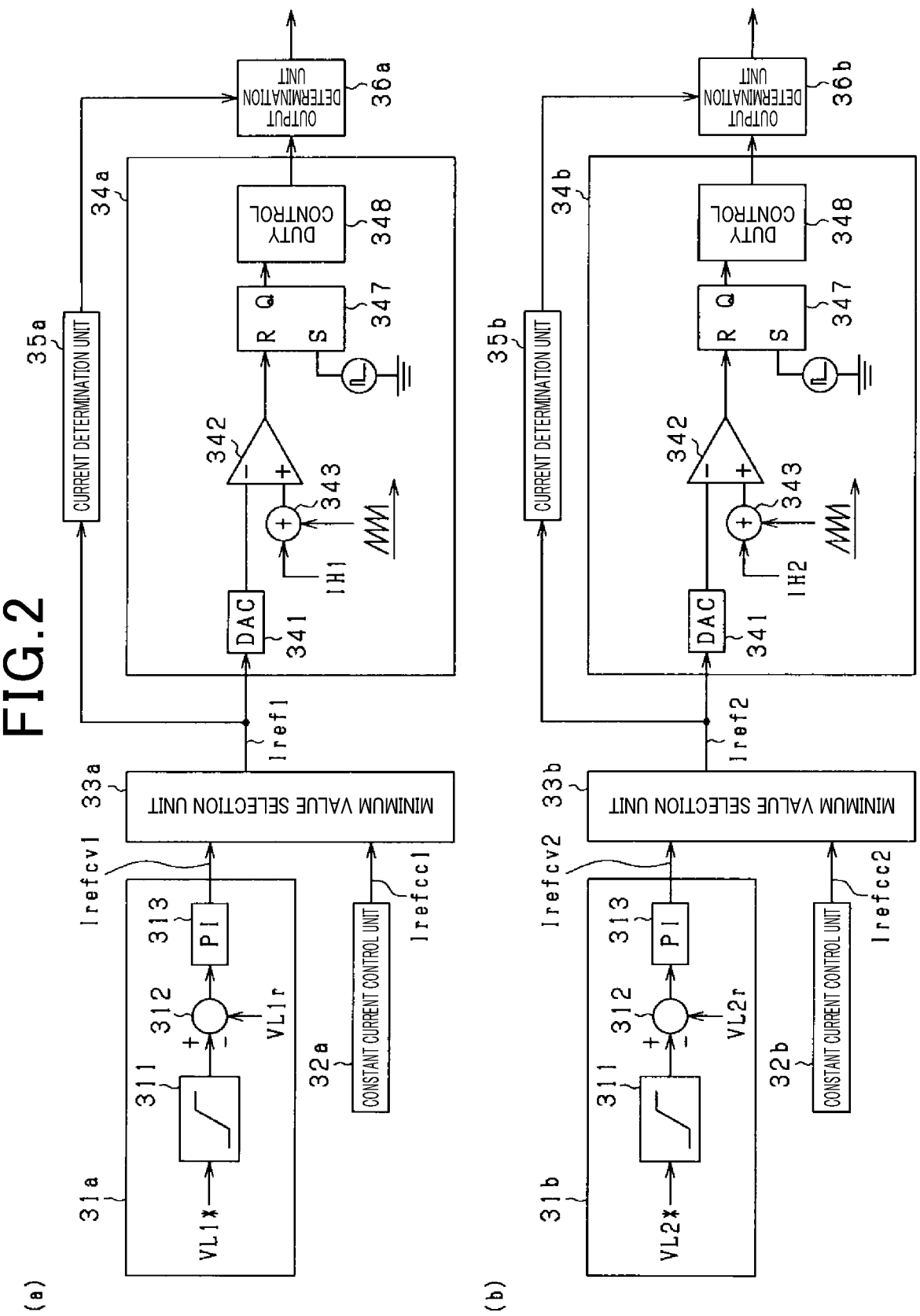
FIG. 2 is a functional block diagram for describing functions of a control unit.

Note that as illustrated in FIG. 2(*b*), the second lower control unit 30*b* includes, as in the first lower control unit 30*a*, a constant voltage control unit 31*b*, a constant current control unit 32*b*, a minimum value selection unit 33*b*, a peak current control unit 34*b*, a current determination unit 35*b*, and an output determination unit 36*b*. The function of each of the units 31*b* to 36*b* is the same as the function of each of the units 31*a* to 36*a* in the first DDC 10*a*, but input and output signals are different. That is, the constant voltage control unit 31*b* calculates, as an operation amount for the control of feeding back the second output voltage VL2r to the second voltage command value VL2*, a second target current value Irefcv2 as a target value of the output current. Moreover, the constant current control unit 32*b* calculates a second upper current value Irefcc2. In the present embodiment, the second upper current value Irefcc2 is set such that the second DDC 10*b* operates with rated current (e.g., 30 A). The minimum value selection unit 33*b* compares the second target current value Irefcv2 and the second upper current value Irefcc2, thereby selecting and outputting a smaller one of these values. Of Irefcv2 and Irefcc2, the current value selected by the minimum value selection unit 33*a* will be hereinafter described as a second current command value Iref2. The current determination unit 35*b* and the output determination unit 36*b* output, as drive signals G1 to G4, OFF drive signals for turning off first to fourth switches Q1 to Q4 of the second DDC 10b in a case where the second current command value Iref2 falls below such a current value that the second DDC 10b can be stably operated.

In the second DDC 10b of the present embodiment, the constant voltage control unit 31b corresponds to a second target current calculation unit, and the minimum value selection unit 33b corresponds to a current value change unit.

Figure 3:
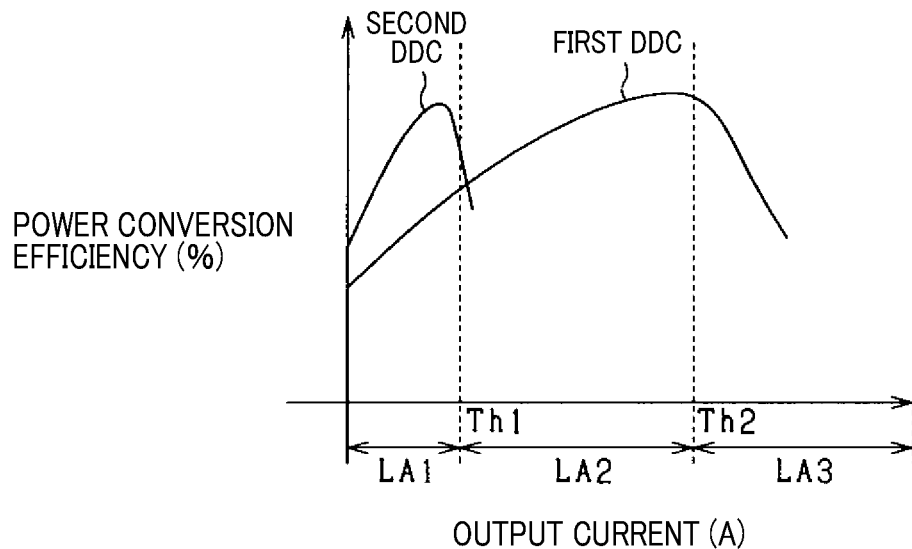
FIG. 3 describes a relationship between output currents and power conversion efficiencies of first and second DDCs.

Next, power conversion efficiencies of the first DDC 10a and the second DDC 10b will be described. FIG. 3 shows the power conversion efficiency [%] in association with the output current of each of the first DDC 10a and the second DDC 10b. Note that in the present embodiment, a power conversion efficiency of the power conversion system 10 is defined by Expression (1) below.

$$\eta = Pout/Pin \times 100 \qquad (1)$$

In Expression (1) above, η represents the power conversion efficiency, and is a value of 0 [%] to 100 [%]. Pout represents the output power of each of the DDCs 10a, 10b, and Pin represents the input power of each of the DDCs 10a, 10b.

The first DDC 10a is different from the second DDC 10b in a load with the maximum power conversion efficiency. As illustrated in FIG. 3, the second DDC 10b is designed such that the power conversion efficiency in a first load area LA1 is maximum, and the first DDC 10a is designed such that the power conversion efficiency in a second load area LA2 with a greater load than that of the first load area LA1 is maximum. Moreover, the power conversion efficiency of the second DDC 10b is higher than the power conversion efficiency of the first DDC 10a across the entirety of the first load area LA1. Further, the power conversion efficiency of the first DDC 10a is higher than the power conversion efficiency of the second DDC 10b across the entirety of the second load area LA2.

In the present embodiment, the rated current of the second DDC 10b has a smaller value than the ranted current of the first DDC 10a. The first load area LA1 is set to a range of equal to or greater than zero and equal to or smaller than a first current threshold Th1, and the first current threshold Th1 is set to the rated current of the second DDC 10b. Moreover, the second load area LA2 is set to a range of greater than the first current threshold Th1 and equal to or smaller than a second current threshold Th2, and the second current threshold Th2 is set to the rated current of the first DDC 10a. Further, a third load area LA3 is set to a range of greater than the second current threshold Th2.

In a case where the first DDC 10a and the second DDC 10b are operated together, the power conversion efficiency of the power conversion system 10 is, for example, calculated from the average of two DDCs 10a, 10b. Thus, in, e.g., a case where the power conversion efficiency of the first DDC 10a is low and the power conversion efficiency of the second DDC 10b is high in any of the load areas LA1 to LA3, the total power conversion efficiency of the power conversion system 10 is low in some cases. In a case where two DDCs 10a, 10b are operated simultaneously, an internal loss is increased by the number of operated DDCs 10a, 10b as compared to the case of independently operating each of the DDCs 10a, 10b.

For these reasons, in the present embodiment, the supervisory control unit 40 switches, according to load current, operation of the power conversion system 10 to any of independent operation of the first DDC 10a, independent operation of the second DDC 10b, and cooperation of the DDCs 10a, 10b, thereby optimizing the power conversion efficiency.

Figure 4:
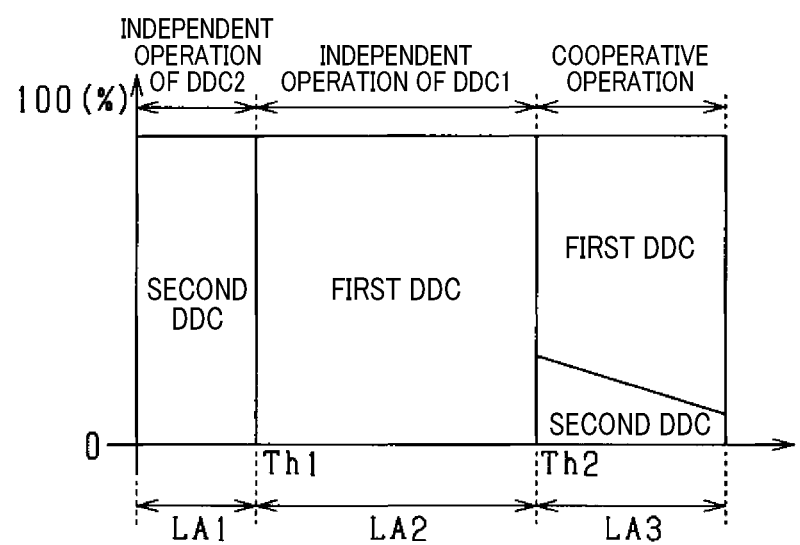
FIG. 4 describes operation of the first and second DDCs according to a load.

FIG. 4 describes each type of operation switched by the supervisory control unit 40. In the present embodiment, the supervisory control unit 40 independently operates only the second DDC 10b with a smaller rated output in the first load area LA1 as a low-load area. In the second load area LA2 with a greater load than that of the first load area, the supervisory control unit 40 independently operates only the first DDC 10a with a greater rated output. In the third load area LA3 greater than the second load area, the supervisory control unit 40 operates the first DDC 10a and the second DDC 10b together.

Figure 5:
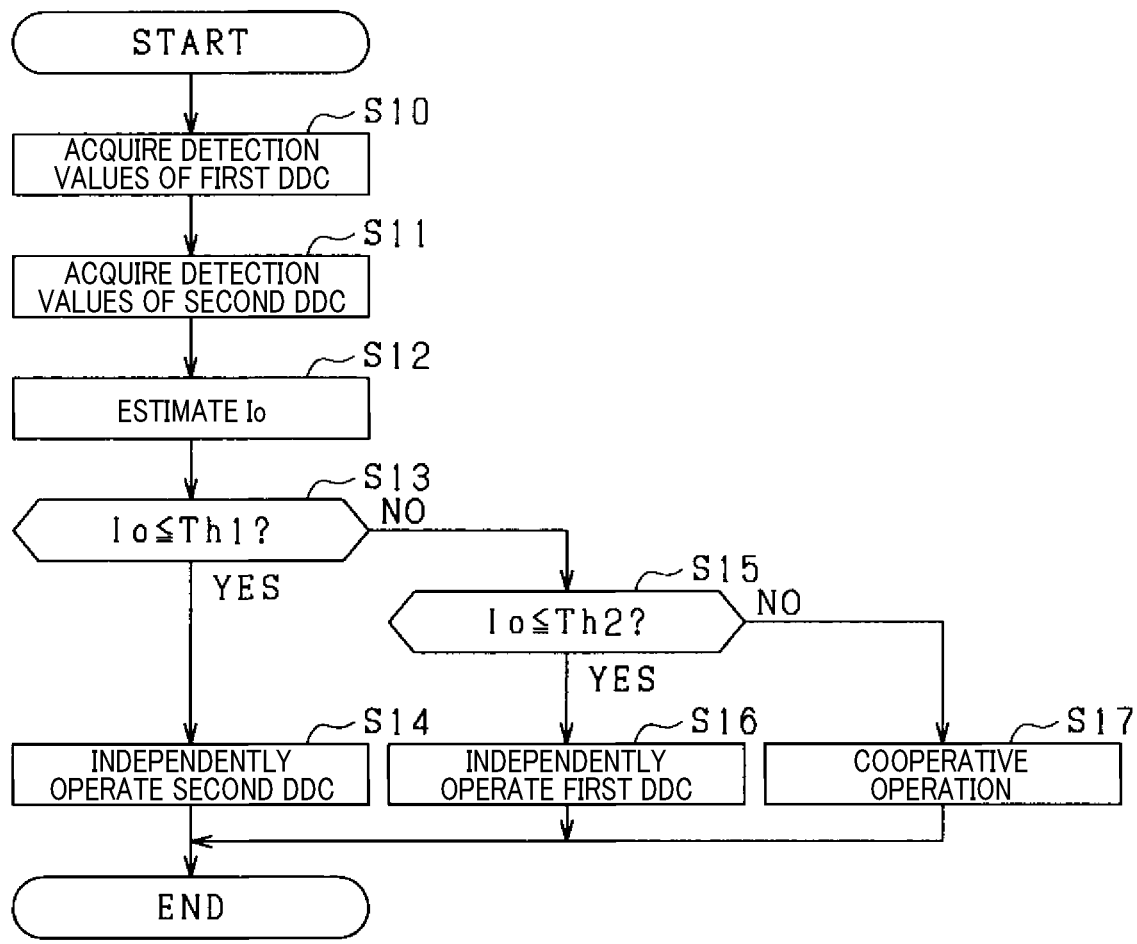
FIG. 5 is a flowchart for describing operation switching processing by a supervisory control unit.

Next, operation switching operation performed by the supervisory control unit 40 will be described. FIG. 5 is a flowchart for describing the switching processing. The processing illustrated in FIG. 5 is repeatedly performed in every predetermined cycle by the supervisory control unit 40.

At step S10, the first input voltage VH1, the first output voltage VL1r, and the first current IH1 are acquired. In the present embodiment, each of the detection values VH1, VL1r, IH1 acquired by the first lower control unit 30a are output to the supervisory control unit 40, and therefore, can be acquired. Step S10 functions as a first voltage acquisition unit.

At step S11, the second input voltage VH2, the second output voltage VL2r, and the second current IH2 are acquired. In the present embodiment, each of the detection values VH2, VL2r, IH2 acquired by the second sub control unit 30b are output to the supervisory control unit 40, and therefore, can be acquired. Step S11 functions as a second voltage acquisition unit.

At step S12, a load current Io is estimated as the load output of the first storage battery 60. The load current Io is the total of current output from each of the first DDC 10a and the second DDC 10b to the first storage battery 60. In the present embodiment, the load current Io is estimated based on each detection value acquired at steps S10, S11 and the turn ratio between the primary-side coil L1 and the secondary-side coil L2. Step S12 corresponds to a load output acquisition unit.

At steps S13, S15, it is determined whether the load current Io estimated at step S12 is a value in the first load area LA1 or a value in the second load area LA2. Steps S13, S15 function as a load determination unit. Moreover, processing S14, S16, S17 performed according to each determination result of steps S13, S15 functions as an operation control unit.

First, at step S13, it is determined whether the load current Io estimated at step S12 is equal to or lower than the first current threshold Th1 or not. The first current threshold Th1 is a value for drawing a line between the first load area LA1 and the second load area LA2.

Note that the first current threshold Th1 may be a value obtained in such a manner that a predetermined margin is added to the rated current of the second DDC 10b. In this case, the first current threshold Th1 is preferably a value greater than such an output current that the power conversion efficiency of the first DDC 10a illustrated in FIG. 3 is maximum.

At step S13, in a case where it is determined that the load current Io is equal to or lower than the first current threshold Th1, it is determined that the load current Io is in the first load area LA1, and the processing proceeds to step S14. At step S14, only the second DDC 10b is independently operated. The supervisory control unit 40 sets the first voltage command value VL1* to a value smaller than the second voltage command value VL2* such that only the second DDC 10b is independently operated.

Figure 6:
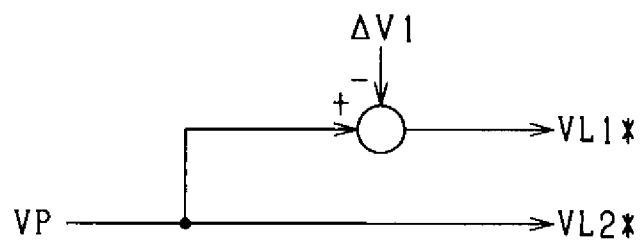
FIG. 6 is a diagram for describing control of the supervisory control unit in the case of independently operating the second DDC.

FIG. 6 is a diagram for describing the processing of setting each of the voltage command values VL1*, VL2* by the supervisory control unit 40 to independently operate the second DDC 10b. The same supervisory voltage command value VP is employed for the first DDC 10a and the second DDC 10b, and for example, is set to a voltage (e.g., 14 V) corresponding to the rated voltage of the first storage battery 60. The supervisory voltage command value VP is, for example, output from a not-shown ECU connected to the supervisory control unit 40.

The supervisory control unit 40 sets a value obtained by subtraction of a first predetermined value ΔV1 (e.g., 0.5 V) from the supervisory voltage command value VP as the first voltage command value VL1* (e.g., 13.5 V) of the first DDC 10a. On the other hand, the supervisory control unit 40 directly sets the supervisory voltage command value VP as the second voltage command value VL2* of the second DDC 10b. The constant voltage control unit 31b of the second sub control unit 30b calculates the second target current value Irefcv2 based on the set second voltage command value VL2* such that the second output voltage VL2r is controlled to the second voltage command value VL2*.

Meanwhile, the constant voltage control unit 31a of the first sub control unit 30a calculates the first target current value Irefcv1 based on the set first voltage command value VL1*. The first voltage command value VL1* is a value smaller than the first output voltage VL1r detected by the first output voltage sensor 22a, and therefore, in the previously-described voltage deviation calculator 312 of FIG. 2, the deviation between the first output voltage VL1r and the first voltage command value VL1* is a negative value. Thus, the first target current value Irefcv1 output from the constant voltage control unit 31a is such a value that the negative deviation is subjected to the proportional integration in the PI controller 313. The first target current value Irefcv1 is selected by the minimum value selection unit 33a, and as the first current command value Iref1, is output to the current determination unit 35a. The current determination unit 35a determines that the input first current command value Iref1 is equal to or smaller than the predetermined current value. As a result, the output determination unit 36a switches all of the drive signals G1 to G4 output from the duty control unit 348 to the OFF drive signals, and outputs the OFF drive signals. Accordingly, operation of the first DDC 10a is stopped, and only the second DDC 10b is independently operated.

Figure 7:
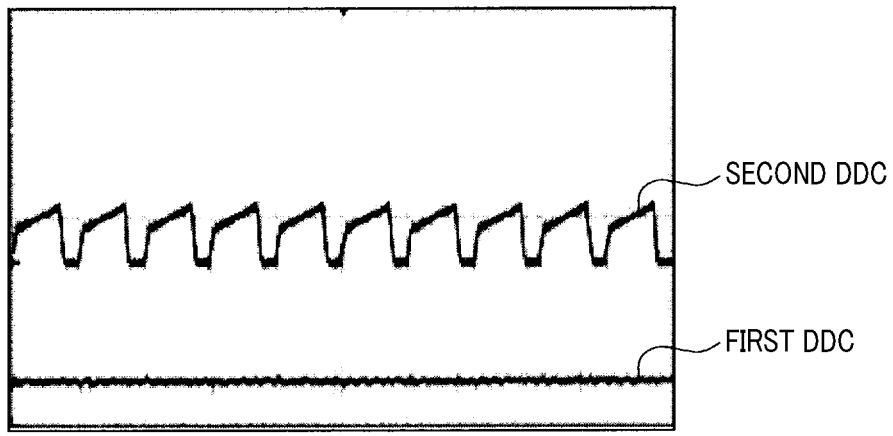
FIG. 7 is an output current waveform diagram in the case of independently operating the second DDC.

FIG. 7 shows output current transition in the first DDC 10a and the second DDC 10b in an independent operation mode of the second DDC 10b. As illustrated in FIG. 7, the second DDC 10b independently operates such that the output current from the second DDC 10b flows in the first storage battery 60, but no output current from the first DDC 10a flows in the first storage battery 60.

Returning to description of FIG. 5 above, in a case where it is, at step S13, determined that the load current Io exceeds the first current threshold Th1, the processing proceeds to step S15, and it is determined whether the load current Io is equal to or lower than the second current threshold Th2 or not. The second current threshold Th2 is a value for drawing a line between the second load area LA2 and the third load area LA3.

Note that the second current threshold Th2 may be set in such a manner that a predetermined margin is added to the rated current of the first DDC 10a. In this case, the second current threshold Th2 is preferably a value greater than such an output current that the power conversion efficiency of the first DDC 10a illustrated in FIG. 3 is maximum.

In a case where it is, at step S15, determined that the load current Io is equal to or lower than the second current threshold Th2, it is determined that the load current is in the second load area LA2, and the processing proceeds to step S16. At step S16, the first DDC 10a is independently operated. Specifically, the supervisory control unit 40 sets the second voltage command value VL2* to a value smaller than the first voltage command value VL1* such that the first DDC 10a is independently operated.

Figure 8:
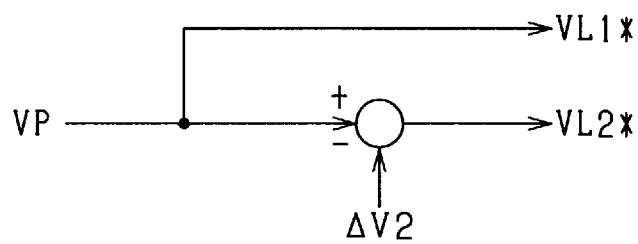
FIG. 8 is a diagram for describing control of the supervisory control unit in the case of independently operating the first DDC.

FIG. 8 is a diagram for describing the processing of setting each of the voltage command values VL1*, VL2* by the supervisory control unit 40 to independently operate the second DDC 10b. In FIG. 8, the supervisory voltage command value VP is also set to a voltage corresponding to the rated voltage of the first storage battery 60, for example.

The supervisory control unit 40 sets a value obtained by subtraction of a second predetermined value ΔV2 (e.g., 0.5 V) from the supervisory voltage command value VP as the second voltage command value VL2* (e.g., 13.5 V) of the second DDC 10a. On the other hand, the supervisory control unit 40 directly sets the supervisory voltage command value VP as the first voltage command value VL1* of the first DDC 10b. The constant voltage control unit 31a of the first DDC 10a calculates the first target current value Irefcv1 based on the set first voltage command value VL1* such that the first output voltage VL1r is controlled to the first voltage command value VL1*.

Meanwhile, the constant voltage control unit 31b of the second DDC 10b calculates the second target current value Irefcv2 based on the set second voltage command value VL2*. The second voltage command value VL2* is a value smaller than the detected second output voltage VL2r, and therefore, in the previously-described voltage deviation calculator 312 of FIG. 2, the deviation between the second output voltage VL2r and the second voltage command value VL2* is a negative value. Thus, the second target current value Irefcv2 output from the constant voltage control unit 31b is such a value that the negative deviation is subjected to the proportional integration in the PI controller 313. The second target current value Irefcv2 is selected by the minimum value selection unit 33b, and as the second current command value Iref2, is output to the current determination unit 35b. The current determination unit 35b determines that the input second current command value Iref2 is equal to or smaller than the predetermined current value. As a result, the output determination unit 36b switches all of the drive signals G1 to G4 output from the duty control unit 348 to the OFF drive signals, and outputs the OFF drive signals. Accordingly, operation of the second DDC 10a is stopped, and only the first DDC 10b is independently operated.

Figure 9:
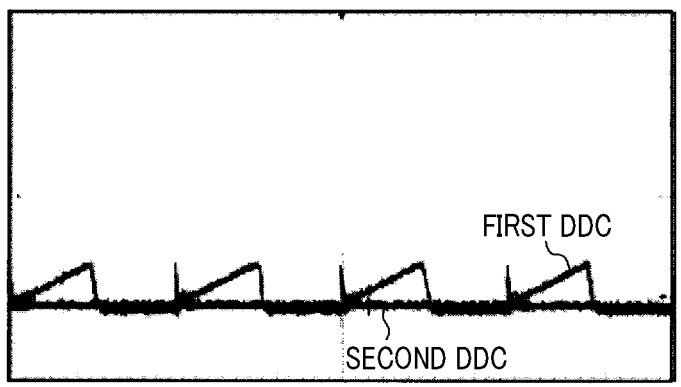
FIG. 9 is an output current waveform diagram in the case of independently operating the first DDC.

FIG. 9 shows the output current of the first DDC 10a and the second DDC 10b in the independent operation mode of the first DDC 10a. In FIG. 9, the first DDC 10a is operated such that the output current from the first DDC 10a flows in the first storage battery 60 and no output current from the second DDC 10b flows in the first storage battery 60.

Returning to description of FIG. 5 above, in a case where it is determined that the load current Io exceeds the second current threshold Th2 (step S15: NO), it is determined that the load current Io is in the third load area LA3, and the processing proceeds to step S17. At step S17, the first DDC 10a and the second DDC 10b are operated together. In the present embodiment, the second DDC 10b is operated with the rated current thereof, and the first DDC 10a is operated with the first voltage command value VL1*.

Figure 10:
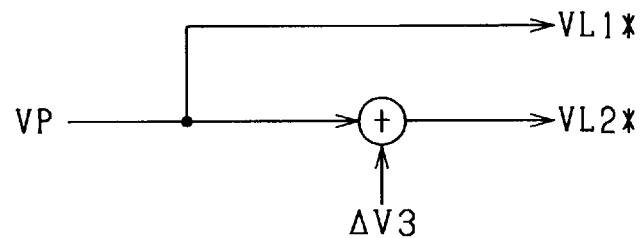
FIG. 10 is a diagram for describing control of the supervisory control unit in the case of operating the first and second DDCs together.
Figure 11:
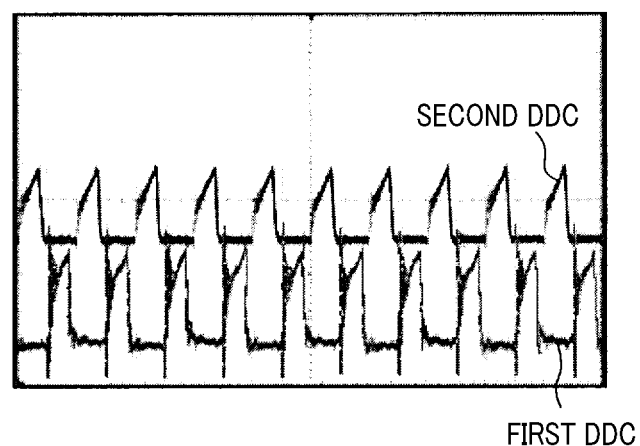
FIG. 11 is an output current waveform diagram in the case of operating the first and second DDCs together.

FIG. 10 describes the processing of setting each of the voltage command values VL1*, VL2* by the supervisory control unit 40 to operate the first DDC 10a and the second DDC 10b together. FIG. 11 is a graph for describing output waveforms of the first DDC 10a and the second DDC 10b.

The supervisory control unit 40 sets a value obtained by addition of a third predetermined value ΔV3 (e.g., 0.5 V) to the supervisory voltage command value VP as the second voltage command value VL2* (e.g., 14.5 V) of the second DDC 10a. On the other hand, the supervisory control unit 40 directly sets the supervisory voltage command value VP as the first voltage command value VL1* of the first DDC 10b. The constant voltage control unit 31a of the first sub control unit 30a calculates the first target current value Irefcv1 based on the set first voltage command value VL1* such that the first output voltage VL1r is controlled to the first voltage command value VL1*.

Meanwhile, the constant voltage control unit 31b of the second sub control unit 30b calculates the second target current value Irefcv2 based on the set second voltage command value VL2*. However, the second voltage command value VL2* is a value greater than the second output voltage VL2r, and therefore, the second target current value Irefcv2 is a value obtained in such a manner that the proportional-integration is performed for a positive deviation between the second output voltage VL2r and the second voltage command value VL2*. Thus, the minimum value selection unit 33b selects the second upper current value Irefcc2 as a value smaller than the second target current value Irefcv2 output from the constant voltage control unit 31b, and as the second current command value Iref2, outputs the second upper current value Irefcc2 to the peak current control unit 34b. The peak current control unit 34b turns on/off each of the switches Q1 to Q4 according to the second current command value Iref2. Accordingly, the first DDC 10a is operated by the constant voltage control of controlling the first output voltage VL1r to the first voltage command value VL1*, and the second DDC 10b is operated by the constant current control of controlling the output current of the second DDC 10a to the rated current thereof.

In a case where the processing at any of steps S14, S16, S17 ends, the processing of FIG. 5 temporarily ends.

With the above-described configuration, the power conversion system 10 according to the present embodiment provides the following advantageous effects.

Figure 12:
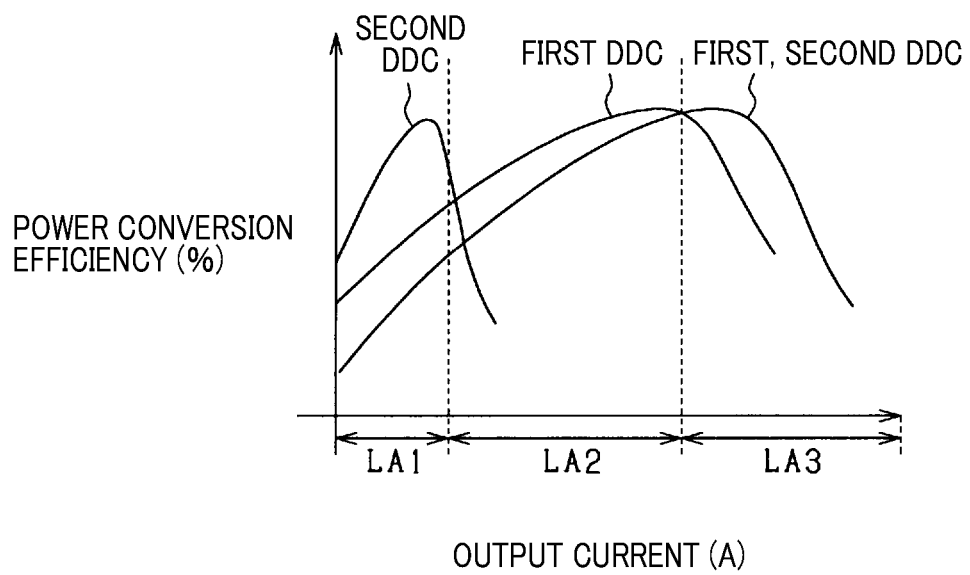
FIG. 12 describes a power conversion efficiency of a power conversion system.

FIG. 12 describes the power conversion efficiency of the power conversion system 10. In FIG. 12, the horizontal axis represents the output current as the load, and the vertical axis represents the power conversion efficiency. FIG. 12 illustrates an efficiency curve in the case of independently operating the first DDC 10a, an efficiency curve in the case of independently operating the second DDC 10b, and an efficiency curve in the case of operating the first DDC 10a and the second DDC 10b together.

In the case of simultaneously operating the first DDC 10a and the second DDC b connected in parallel with the first storage battery 60, the power conversion efficiency is, in the first load area LA1 and the second load area LA2, lower than that in the case of independently operating the DDCs 10a, 10b. This is because the internal loss such as an iron loss of the transformer is greater in the case of co-operating the DDCs 10a, 10b than in the case of independently operating the DDCs 10a, 10b.

Thus, the supervisory control unit 40 independently operates the second DDC 10b in the case of determining that the load current Io is the value in the first load area LA1. Moreover, the supervisory control unit 40 independently operates the first DDC 10a in the case of determining that the load current Io is the value in the second load area LA2. As a result, in the first load area LA1 and the second load area LA2, the power conversion efficiency is enhanced as compared to the case of operating the first DDC 10a and the second DDC 10b together. Note that the supervisory control unit 40 operates the first DDC 10a and the second DDC 10b together in the case of determining that the load current Io is in the third load area LA3 greater than the second load area LA2. Thus, the first DDC 10a and the second DDC 10b can be independently operated in the load area with a high power conversion efficiency according to the load current Io, and therefore, a combination of optimal efficiency curves at each load is provided as the power conversion efficiency of the power conversion system 10. As a result, the power conversion efficiency of the power conversion system 10 can be optimized.

Each of the DDCs 10a, 10b is designed such that the power conversion efficiency is maximum around the rated current. Moreover, in a case where the load current Io is a value of equal to or smaller than the rated current of the second DDC 10b, it is determined that the load current Io is in the first load area LA1. In this case, determination in which load area the load current is can be made using a quantified value as the rated current. Thus, the accuracy of determination of which load area the load current is in can be enhanced, and the second DDC 10b can be operated with a high power conversion efficiency.

The rated current of the first DDC 10a is set higher than the rated current of the second DDC 10b. Moreover, in a case where the load current Io is a value of equal to or greater than the rated current of the second DDC 10b and equal to or smaller than the rated current of the first DDC 10a, the supervisory control unit 40 determines that the load current Io is in the second load area LA2. In this case, the accuracy of determination of which load area the load current is in can be also enhanced, and the first DDC 10a can be also operated with a high power conversion efficiency.

In a case where it is determined that the load current Io is in the first load area LA1, the supervisory control unit 40 sets the first voltage command value VL1* to a value smaller than the second voltage command value VL2* such that only the second DDC 10b is operated. In a case where it is determined that the load current Io is in the second load area LA2, the supervisory control unit 40 sets the second voltage command value VL2* to a value smaller than the first voltage command value VL1* such that only the first DDC 10b is operated. In this case, the first voltage command value VL1* is set to a value smaller than the second voltage command value VL2*, and therefore, the value obtained in such a manner that the proportional-integration is performed for the deviation between the first voltage command value VL1* and the first output voltage VL1r is calculated as the operation amount for the feedback control of setting the output voltage of the first DDC 10a. Moreover, the second voltage command value VL2* is changed to a value smaller than the first voltage command value VL1*, and therefore, the value obtained in such a manner that the proportional-integration is performed for the deviation between the second voltage command value VL2* and the second output voltage VL2r is calculated as the operation amount for the feedback control of setting the output voltage of the second DDC 10b. Then, the current determination unit 35a, 35b and the output determination unit 36a, 36b as the stop control unit compare the operation amount with a predetermined threshold, and stop operation of the first DDC 10a or the second DDC 10b in a case where the operation amount falls below the predetermined threshold. In this case, any of the DDCs 10a, 10b can be independently operated by a simple technique with no information exchange between the first DDC 10a and the second DDC 10b.

In a case where it is determined that the load current Io is in the third load area LA3, the supervisory control unit 40 operates the first DDC 10a such that the output voltage of the first DDC 10a reaches the first voltage command value VL1*, and operates the second DDC 10b such that the output current of the second DDC 10b reaches the rated current thereof. In this case, in a situation where the first DDC 10a and the second DDC 10b operate together, the second DDC 10b can be operated with a current around the rated current, and can be operated with a high power conversion efficiency.

In a case where it is determined that the load current Io is in the third load area LA3, the supervisory control unit 40 sets the second voltage command value VL2* to a value greater than the first voltage command value VL1* such that the second DDC 10b is operated with a current around the rated current.

In this case, the first sub control unit 30a performs the control of feeding back the first output voltage VL1r to the first voltage command value VL1*. As a result, the voltage value of the first storage battery 60 reaches a value specified by the first voltage command value VL1*. On the other hand, the second voltage command value VL2* is a value greater than the second output voltage VL2r detected for the first storage battery 60, and therefore, the deviation between the second output voltage VL2r and the second voltage command value VL2* is a positive value. Thus, the second target current value Irefcv2 output from the constant voltage control unit 31b of the second sub control unit 30b is such a value that the positive deviation is subjected to the proportional integration. Then, the minimum value selection unit 33b of the second sub control unit 30b selects a smaller one, i.e., the second upper current value Irefcc2, of the second target current value Irefcv2 and the second upper current value Irefcc2, and the second upper current value Irefcc2 is taken as the second current command value Iref2 to operate the second DDC 10b. Accordingly, the first DDC 10a is operated with the first voltage command value VL1*, and the second DDC 10a is operated with a current around the rated current. Thus, the second DDC 10b can be operated with a current around the rated current by the technique of simply changing the voltage command value.

Second Embodiment

Hereinafter, configurations different from those of the first embodiment will be mainly described in a second embodiment. Note that in each embodiment below, the same reference signs are used to represent identical or equivalent elements in the figures, and the same description of the identical elements is applicable.

Figure 13:
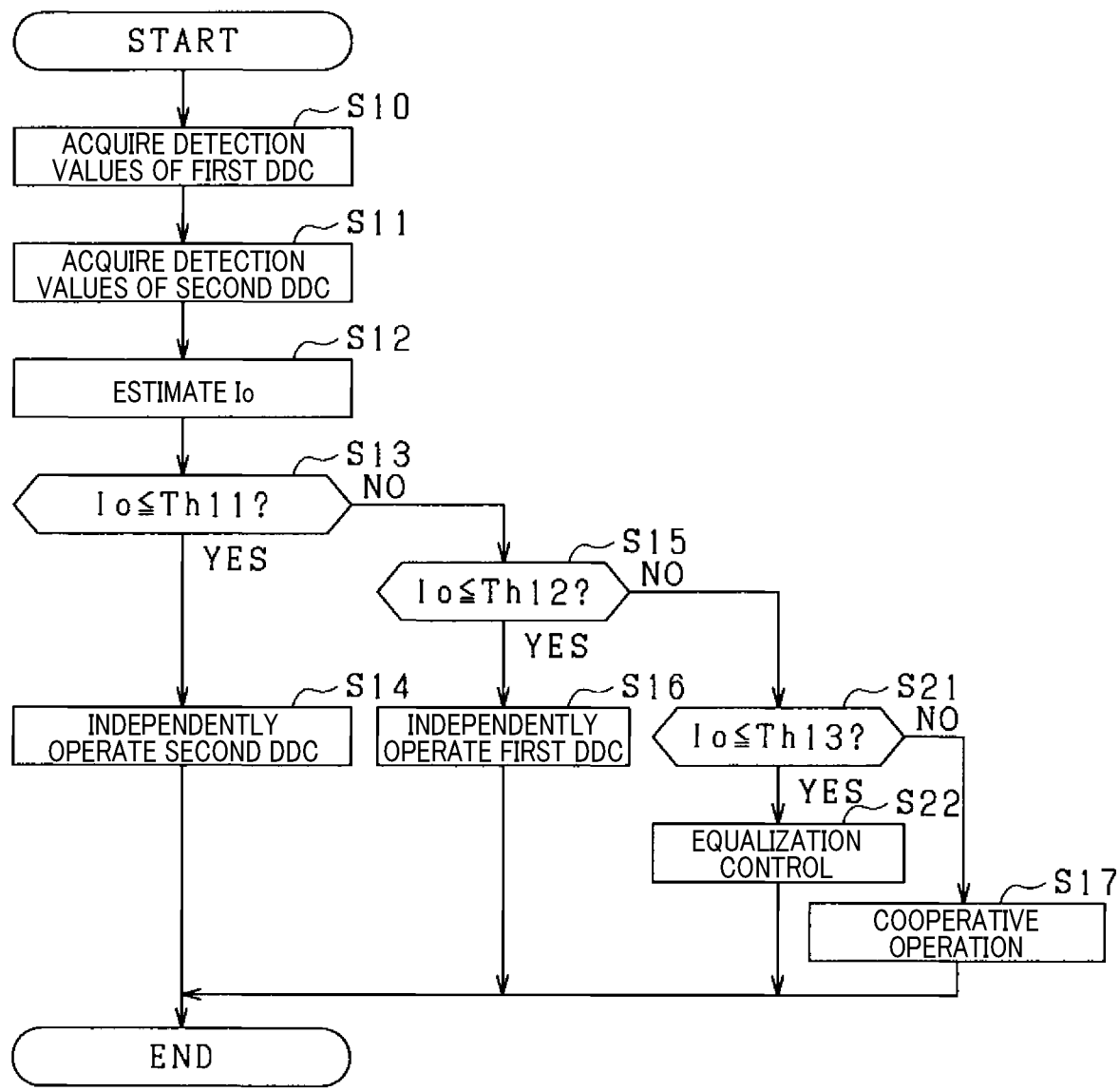
FIG. 13 is a flowchart for describing operation switching processing by a supervisory control unit according to a second embodiment.

In the present embodiment, in a case where a load current Io is in a third load area LA3 and is equal to or lower than twice as high as the rated current of a second DDC 10b, an supervisory control unit 40 performs the equalization control of equalizing output current of a first DDC 10a and output current of the second DDC 10b. FIG. 13 is a flowchart for describing operation switching processing performed by the supervisory control unit 40 in the present embodiment. Note that processing from step S11 to step S16 is similar to that of the first embodiment, and description thereof will be omitted as necessary.

In the present embodiment, a first current threshold Th11 at step S13 is set to a value (e.g., 20 A) smaller than the rated current of the second DDC 10b. Moreover, a second current threshold Th12 at step S15 is set to a value (e.g., 40 A) greater than the rated current of the second DDC 10b and smaller than the rated current of the first DDC 10b.

In a case where it is, at step S15 of FIG. 13, determined that the load current Io exceeds the second current threshold Th12, the processing proceeds to step S21, and it is determined whether the load current Io is equal to or lower than a third current threshold Th13. In the present embodiment, the third current threshold Th13 is set to a value (e.g., 60 A) greater than the second current threshold Th12 and obtained by doubling of the rated current of the second DDC 10b. That is, when the load current Io is equal to or lower than the third current threshold Th13, in a case where the equalization control is performed, the output current of the second DDC 10b can be set to be equal to or lower than the rated current.

In a case where it is, at step S21, determined that the load current Io is equal to or lower than the third current threshold Th13, the processing proceeds to step S22, and the equalization control is performed.

Figure 14:
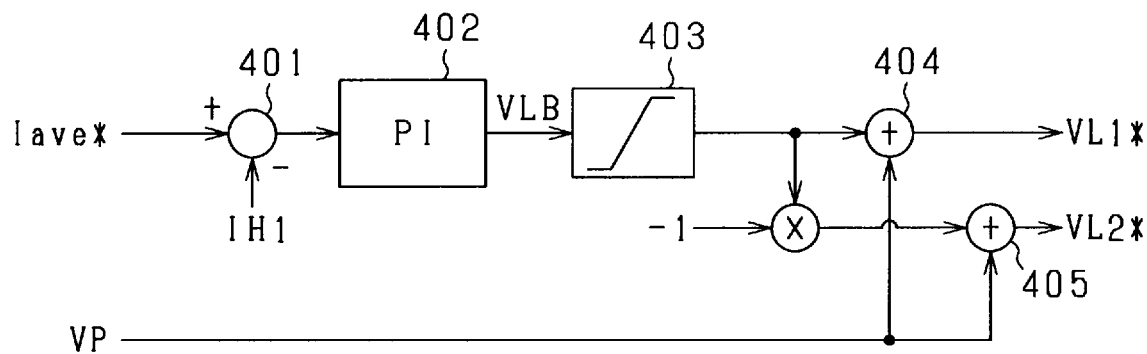
FIG. 14 is a diagram for describing control of the supervisory control unit in the case of performing equalization control.

FIG. 14 is a diagram for describing control of the supervisory control unit 40 in the case of performing the equalization control. In FIG. 14, a supervisory voltage command value VP is also set to a voltage corresponding to the rated voltage of a first storage battery 60.

A current deviation calculator 401 subtracts a first current IH1 from an output current average Iave*, thereby calculating a deviation. The output current average Iave* is the average of the first current IH1 detected by a first current sensor 23a and a second current IH2 detected by a second current sensor 23b. A PI controller 402 calculates a correction voltage VLB by proportional-integral control based on the deviation calculated by the current deviation calculator 401. A slow changer 403 performs slow change processing for the correction voltage VLB calculated by the PI controller 402, and outputs the resultant voltage. A first adder 404 sets, as a first voltage command value VL1*, the sum of the correction voltage VLB subjected to the slow change processing and the supervisory voltage command value VP. A second adder 405 sets, as a second voltage command value VL2*, the sum of a sign-inverted value of the correction voltage VLB subjected to the slow change processing and the supervisory voltage command value VP.

Figure 15:
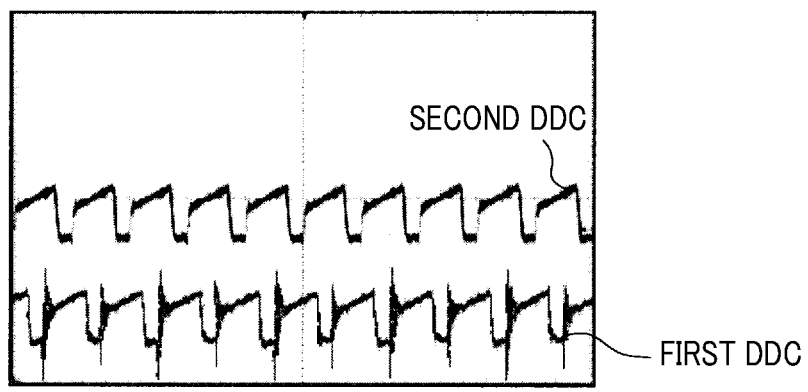
FIG. 15 is an output current waveform diagram in the equalization control.
Figure 16:
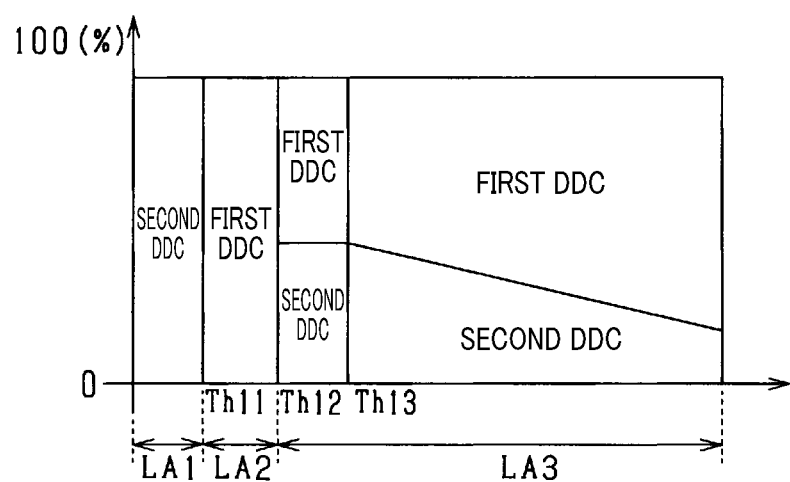
FIG. 16 describes operation of first and second DDCs according to a load.

According to the processing illustrated in FIG. 14, the first voltage command value VL1* and the second voltage command value VL2* are corrected such that the output currents are equalized. Thus, as illustrated in FIG. 15, the output current of the first DDC 10a and the output current of the second DDC 10b are output in an equalized state. Consequently, as illustrated in FIG. 16, in a case where the load current is in the third load area LA3 and is equal to or lower than twice as high as the rated current of the second DDC 10b, the output currents of the first DDC 10a and the second DDC 10b are equally output to a first storage battery 60.

Returning to description of FIG. 13 above, in a case where it is, at step S21, determined that the load current Io exceeds the third current threshold Th13, the processing proceeds to step S17. Thus, as illustrated in FIG. 16, in a case where the load current is in the third load area LA3 and exceeds the value obtained by doubling of the rated current of the second DDC 10b, the first DDC 10a is operated with the first voltage command value VL1*, and the second DDC 10b is operated with a current around the rated current.

With the above-described configuration, a power conversion system 10 according to the present embodiment provides the following advantageous effects.

In a case where the load current Io is a value greater than a second load area LA2 and equal to or smaller than the value obtained by doubling of the rated current of the second DDC 10b, the supervisory control unit 40 operates the first DDC 10a and the second DDC 10b such that the output currents of the first DDC 10a and the second DDC 10b are equalized. In this case, load concentration on any of the DDCs 10a, 10b can be reduced, and variation in a life duration between the DDCs 10a, 10b can be reduced.

Modification of Second Embodiment

In the second embodiment, the equalization control performed by the supervisory control unit 40 may be configured as follows. Specifically, one of the voltage command values VL* of the first DDC 10a and the second DDC 10b is adjusted to the other one of the voltage command values VL*, and in this manner, the output currents of the first DDC 10a and the second DDC 10b are equalized for the first storage battery 60. In this case, a greater one of the voltage command values VL* is adjusted to a smaller one of the voltage command values VL* so that the load current can be reduced.

Various Modifications of First and Second Embodiments

Each of the current thresholds Th1, Th2, Th3 may be determined based on a relationship among the power conversion efficiency of the power conversion system 10, the power conversion efficiency of the first DDC 10a, and the power conversion efficiency of the second DDC 10b. In this case, the first current threshold Th1 is, in the first load area LA1, determined based on the maximum output current of the second DDC 10b satisfying Expression (2) below.

$$\eta 12 \geq (\eta 11 + \eta 12)/2 \quad (2)$$

In this expression, η11 represents a power conversion efficiency corresponding to the output current of the first DDC 10a in the first load area, and η12 represents a power conversion efficiency corresponding to the output current Io2 of the second DDC 10b.

The second current threshold Th2 is, in the second load area, determined based on the maximum output current of the first DDC 10a satisfying Expression (3) below.

$$\eta 21 \geq (\eta 21 + \eta 22)/2 \quad (3)$$

In this expression, η21 represents a power conversion efficiency corresponding to the output current of the first DDC 10a in the second load area, and η22 represents a power conversion efficiency corresponding to the output current Io2 of the second DDC 10b.

The supervisory control unit 40 may detect, in addition to estimation of the output current (the load current) based on each of the currents IH1, IH2, the output currents of the first DDC 10a and the second DDC 10b as the load current. In this case, the first DDC 10a and the second DDC 10b include current detection units configured to detect the amount of current output from the reactor 15, and detect detection results of the current detection units as the output currents and output these results to the supervisory control unit 40.

Instead of calculating the target current value based on the value obtained in such a manner that the proportional-integral control is performed for the deviation between the voltage command value VL* and the output voltage VLr, the constant voltage control unit 31a, 31b may calculate the target current value based on any of values obtained in such a manner that proportional control and integral control are performed for the deviation between the voltage command value VL* and the output voltage VLr.

A power output from each of the first DDC 10a and the second DDC 10b may be the load output estimated by the supervisory control unit 40. In this case, a rated power is used as an output rated value instead of the rated current.

The configuration in which a control device is divided into the supervisory control unit 40 and the sub control units 30a, 30b has been set forth merely as an example. Instead, a single control unit may have each function of the supervisory control unit 40 and the first and second sub control units 30a, 30b.

Third Embodiment

Figure 17:
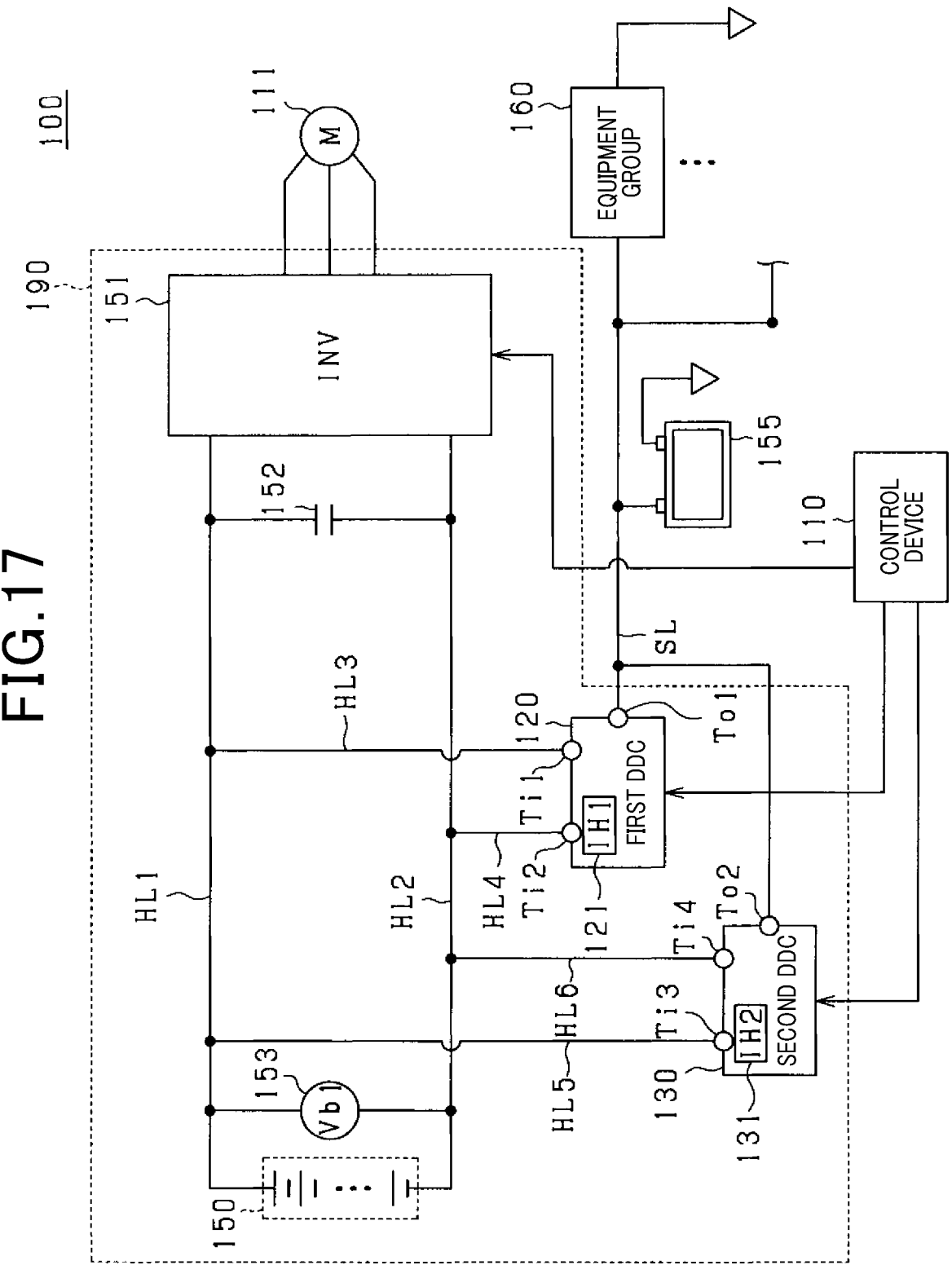
FIG. 17 is a configuration diagram of a control system according to a third embodiment.

Hereinafter, a third embodiment embodying the present disclosure will be described with reference to the drawings. FIG. 17 is a configuration diagram of a control system 100 according to a third embodiment. The control system 100 is mounted on a vehicle. Moreover, in the present embodiment, the vehicle on which the control system 100 is mounted is a hybrid vehicle including, as a drive power source, an engine as an internal-combustion engine and a drive motor.

The control system 100 includes a first storage battery 150 corresponding to an electric storage device, an inverter 151, a first DDC 120, and a second DDC 130. In the present embodiment, the first storage battery 150, the inverter 151, the first DDC 120, and the second DDC 130 form a power conversion system 190. In the present embodiment, the first DDC 120 corresponds to a first power conversion device, and the second DDC 130 corresponds to a second power conversion device.

A motor 111, an equipment group 160, and a second storage battery 155 as power supply targets are connected to the control system 100. Moreover, the control system 100 supplies power to the motor 111, the equipment group 160, and the second storage battery 155 based on power supplied by the first storage battery 150.

The first storage battery 150 functions as a main power source in the control system 100. In the present embodiment, the first storage battery 150 is a lithium-ion storage battery. Specifically, the first storage battery 150 is an assembled battery configured such that multiple lithium-ion storage battery cells are combined, and for example, generates a first terminal voltage Vb1 of 200 V to 400 V.

The inverter 151 converts the power supplied from the first storage battery 150 to supply power to the motor 111. An input side of the inverter 151 is connected to a first high-voltage line HL1 connected to a plus-side terminal of the first storage battery 150 and a second high-voltage line HL2 connected to a minus-side terminal of the first storage battery 150. Moreover, a smoothing capacitor 152 is connected in parallel with the inverter 151 between the first high-voltage line HL1 and the second high-voltage line HL2. Moreover, an output side of the inverter 151 is connected to the motor 111.

The motor 111 is driven by AC voltage converted by the inverter 151. The motor 111 is a motor for driving the vehicle. The motor 111 has a function of performing regenerative power generation by means of vehicle kinetic energy while the vehicle is being driven. Moreover, the inverter 151 has the rectification function of rectifying AC current into DC current. Upon vehicle braking, the inverter 151 rectifies AC current output from the motor 111 by regenerative power generation into DC current. The rectified DC current is supplied to the first storage battery 150 via each of the high-voltage lines HL1, HL2, and accordingly, the first storage battery 150 is charged.

The first DDC 120 is a current resonant converter configured to generate resonance by an inductor and a capacitor. In the present embodiment, the first DDC 120 is an insulating step-down converter configured such that a low-voltage-side first circuit and a high-voltage-side second circuit are connected to each other via a transformer.

The first circuit of the first DDC 120 includes multiple semiconductor switches. The first DDC 120 switches ON/OFF of each semiconductor switch to perform step-down operation for the first terminal voltage Vb1. A first input terminal Ti1 of the first DDC 120 is connected to a third high-voltage line HL3 connected to the first high-voltage line HL1. Moreover, a second input terminal Ti2 is connected to a fourth high-voltage line HL4 connected to the second high-voltage line HL2. Further, a first output terminal To1 is connected to a subline SL.

A first current sensor 121 configured to detect a first current IH1 flowing in the first circuit is provided at the first circuit. An output current from the second circuit of the first DDC 120 can be estimated based on the first current IH1 detected by the first current sensor 121 and the turn ratio of the transformer of the first DDC 120. Hereinafter, the output current of the first DDC 120 will be described as a first output current Iout1.

The second DDC 130 is a phase shift converter configured to control the timing of an ON period of multiple semiconductor switches. In the present embodiment, the second DDC 130 is an insulating step-down converter configured such that a low-voltage-side third circuit and a high-voltage-side fourth circuit are connected to each other via a transformer.

The third circuit of the second DDC 130 includes the multiple semiconductor switches. The second DDC 130 switches ON/OFF of each semiconductor switch to perform step-down operation for the first terminal voltage Vb1. A third input terminal Ti3 of the second DDC 130 is connected to a fifth high-voltage line HL5 connected to the first high-voltage line HL1. Moreover, a fourth input terminal Ti4 is connected to a sixth high-voltage line HL6 connected to the second high-voltage line HL2. A second output terminal Tot of the second DDC 130 is connected to the subline SL.

A second current sensor 131 configured to detect a second current IH2 flowing in the third circuit is provided at the third circuit. An output current from the fourth circuit of the second DDC 130 can be estimated based on the second current IH2 detected by the second current sensor 131 and the turn ratio of the transformer of the second DDC 130. Hereinafter, the output current of the second DDC 130 will be described as a second output current Iout2.

In the present embodiment, the rated current of the first DDC 120 is higher than the rated current of the second DDC 130. For example, the rated current of the first DDC 120 is 150 [A], and the rated current of the second DDC 130 is 30 [A]. Moreover, the rated current of the first DDC 120 is a value greater than the maximum value of a load current IL required for the control system 100.

The equipment group 160 and the second storage battery 155 to which the power is supplied via the subline SL are connected to the subline SL. A positive-electrode-side terminal of the equipment group 160 is connected to the subline SL. Moreover, a negative-electrode-side terminal of the equipment group 160 is connected to ground. The equipment group 160 includes, for example, audio equipment, a navigation device, a power sliding door, a power back door, a meter and the like. Moreover, a plus-side terminal of the second storage battery 155 is connected to the subline SL, and a minus-side terminal of the second storage battery 155 is connected to ground. Thus, at least any of the output voltages Vout of the first and second DDCs 120, 130 and a second terminal voltage Vb2 as a terminal voltage of the second storage battery 155 is applied to the subline SL.

In the present embodiment, the storage capacity of the second storage battery 155 is smaller than the storage capacity of the first storage battery 150. Moreover, the second terminal voltage Vb2 of the second storage battery 155 is lower than the first terminal voltage Vb1 of the first storage battery 150. For example, the terminal voltage of the second storage battery 155 in a fully-charged state is 12 V.

The control system 100 includes a control device 110. The control device 110 calculates, according to a user's accelerator operation amount, a command torque necessary for driving of the motor 111. The control device 110 controls the inverter 151 such that the torque of the motor 111 is controlled to the command torque.

Moreover, the control device 110 drives the semiconductor switches of the first and second DDCs 120, 130. The control device 110 controls a duty ratio as the ratio of the ON period to a single switching cycle in each semiconductor switch such that the output voltages Vout1, Vout2 of the first and second DDCs 120, 130 are controlled to first and second output voltage command values V1*, V2*. For example, the control device 110 sets a supervisory voltage command value VP common to the first and second DDCs 120, 130, and sets each of the output voltage command values V1*, V2* from the supervisory voltage command value VP. By the control of the duty ratio by the control device 110, the output voltages Vout1, Vout2 of the first and second DDCs 120, 130 are controlled and supplied to the subline SL.

Note that in the present embodiment, the control device 110 has been described as a single device, but the present disclosure is not limited to above. For example, it may be configured such that a control device configured to control the inverter 151 and a control device configured to drive the semiconductor switches of the first and second DDCs 120, 130 are separately provided.

The control system 100 includes a voltage sensor 153. Each terminal of the voltage sensor 153 is connected to the plus-side and minus-side terminals of the first storage battery 150, and detects the first terminal voltage Vb1.

Figures 18, 19:
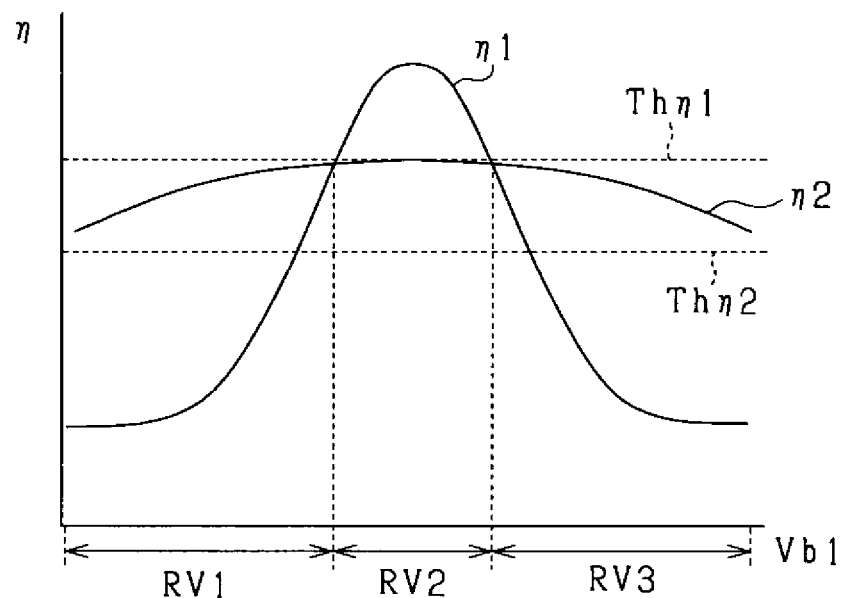
FIG. 18 describes efficiency characteristics of first and second DDCs in association with a first terminal voltage Vb1.
FIG. 19 describes operation of the first and second DDCs in each of voltage ranges RV1 to RV3.

Next, efficiency characteristics of the first and second DDCs 120, 130 in association with the first terminal voltage Vb1 will be described with reference to FIG. 18. FIG. 18 shows a graph in which the horizontal axis represents the first terminal voltage Vb1, and the vertical axis represents an efficiency η (a power conversion efficiency). In the horizontal axis, the first terminal voltage Vb1 is divided into a first voltage range RV1, a second voltage range RV2, and a third voltage range RV3. A voltage value in the first voltage range RV1 is smaller than a first boundary value, and a voltage value in the second voltage range RV2 is greater than the first boundary value. Moreover, a voltage value in the second voltage range RV2 is smaller than a second boundary value, and a voltage value in the third voltage range RV3 is greater than the second boundary value. The first boundary value is a value smaller than the second boundary value. Moreover, the minimum value of the first voltage range RV1 is the lower limit of the first terminal voltage Vb1. Further, the maximum value of the third voltage range RV3 is the upper limit of the first terminal voltage Vb1.

The second voltage range RV2 corresponds to a first range, and the first voltage range RV1 and the third voltage range RV3 correspond to a second range. In the present embodiment, the efficiency η is set as the percentage of the output power with respect to the input power of the first and second DDCs 20, 30.

The first efficiency η1 of the first DDC 120 is a value higher than the second efficiency η2 of the second DDC 130 in the second voltage range RV2. In the second voltage range RV2 of FIG. 18, the first efficiency η1 is a value of equal to or greater than a first efficiency threshold Thη1, and the second efficiency η2 is a value smaller than the first efficiency threshold Thη1. On the other hand, in the first and third voltage ranges RV1, RV3, the first efficiency η1 is a value smaller than the second efficiency η2.

A change in the second efficiency η2 in association with a change in the first terminal voltage Vb1 when the first terminal voltage Vb1 changes from the second voltage range RV2 to the first voltage range RV1 or the third voltage range RV3 is smaller than a change in the first efficiency η1. In each of the voltage ranges RV1 to RV3, the first efficiency η1 of the first DDC 120 fluctuates from a value of equal to or greater than the first efficiency threshold Thη1 to a value of equal to or smaller than a second efficiency threshold Thη2. On the other hand, in each of the voltage ranges RV1 to RV3, the second efficiency η2 fluctuates to a value of equal to or greater than the second efficiency threshold Thη2 and smaller than the first efficiency threshold Thη1. The second efficiency threshold Thη2 is a value smaller than the first efficiency threshold Thη1.

In some cases, fluctuation in the first terminal voltage Vb1 as an input voltage occurs in the control system 100. For example, current supplied from the first storage battery 150 to the motor 111 via the inverter 151 increases, and accordingly, the first terminal voltage Vb1 decreases. If the first and second DDCs 120, 130 equally have characteristics that can accept a broad input voltage range, the efficiency of the entirety of the control system 100 might be sacrificed in some cases. Moreover, in the control system 100, the load current IL required for the equipment group 160 might fluctuate in some cases. Further, each of the efficiencies η1, η2 of the first and second DDCs 120, 130 also changes due to fluctuation in the load current IL.

For these reasons, the control device 110 takes the first terminal voltage Vb1 as a voltage parameter, and sets the sharing amounts (Iout1, Iout2) of the load current IL of the first and second DDCs 120, 130 according to the voltage parameter and the load current IL. FIG. 19 describes operation of the first and second DDCs 120, 130 in each of the voltage ranges RV1 to RV3. In the present embodiment, the first DDC 120 is preferentially operated in the second voltage range RV2 in which the first efficiency η1 of the first DDC 120 is higher than the second efficiency η2 of the second DDC 130. That is, it is set such that the first output current Iout1 of the first DDC 120 is more than the second output current Iout2 of the second DDC 130. On the other hand, in the first voltage range RV1 and the third voltage range RV3 in which the second efficiency η2 of the second DDC 130 is higher than the first efficiency η1 of the first DDC 120, the second DDC 130 is preferentially operated. That is, it is set such that the second output current Iout2 is more than the first output current Iout1. Further, in the second voltage range RV2, the second DDC 130 is operated in an auxiliary manner to change the sharing amounts according to the characteristics of the first DDC 120 in association with the load current IL.

Figure 20:
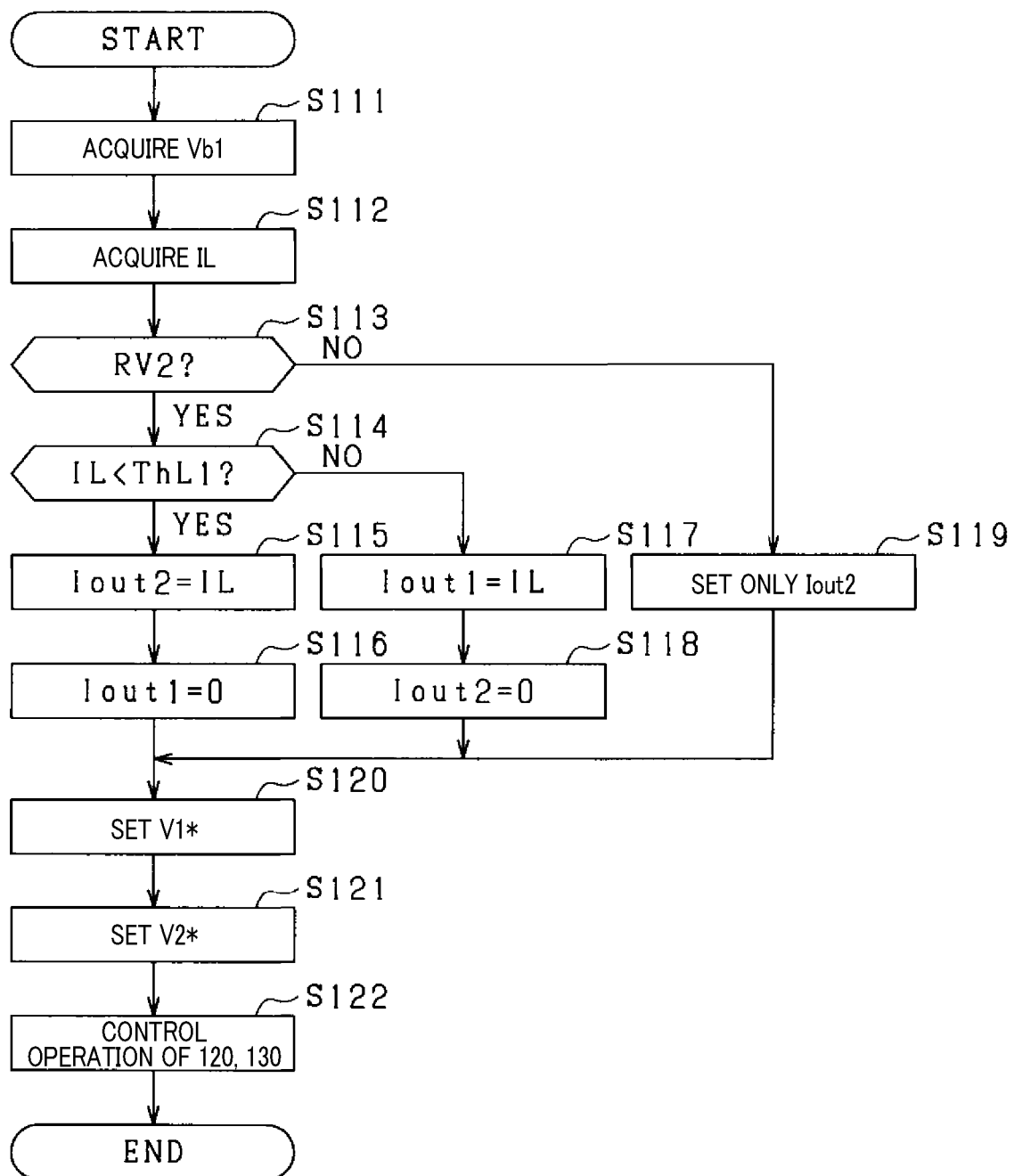
FIG. 20 is a flowchart for describing sharing amount setting processing.

Next, the processing of setting the sharing amounts according to the first terminal voltage Vb1 and the load current IL will be described. FIG. 20 is a flowchart for describing the processing of setting the sharing amounts of the first and second DDCs 120, 130. The processing illustrated in the flowchart of FIG. 20 is repeatedly performed in a predetermined control cycle by the control device 110. In FIG. 20, steps S113 to S119, S120, S121 correspond to a sharing setting unit.

At step S111, the first terminal voltage Vb1 is acquired. The first terminal voltage Vb1 is acquired as an actual measurement value obtained by the voltage sensor 153.

At step S112, the load current IL is acquired. In the present embodiment, the total of the output currents Iout1, Iout2 of the first and second DDCs 120, 130 is estimated as the load current IL based on the first current IH1 and the second current IH2. Steps S111, S112 correspond to a load output acquisition unit.

At step S113, it is determined whether the first terminal voltage Vb1 acquired at step S111 is in the second voltage range RV2 or not. At step S113, when it is determined that the first terminal voltage Vb1 is in the second voltage range RV2, the processing proceeds to step S114. At steps S114 to S118, the sharing amounts of the first and second DDCs 120, 130 are set.

Figures 21, 22:
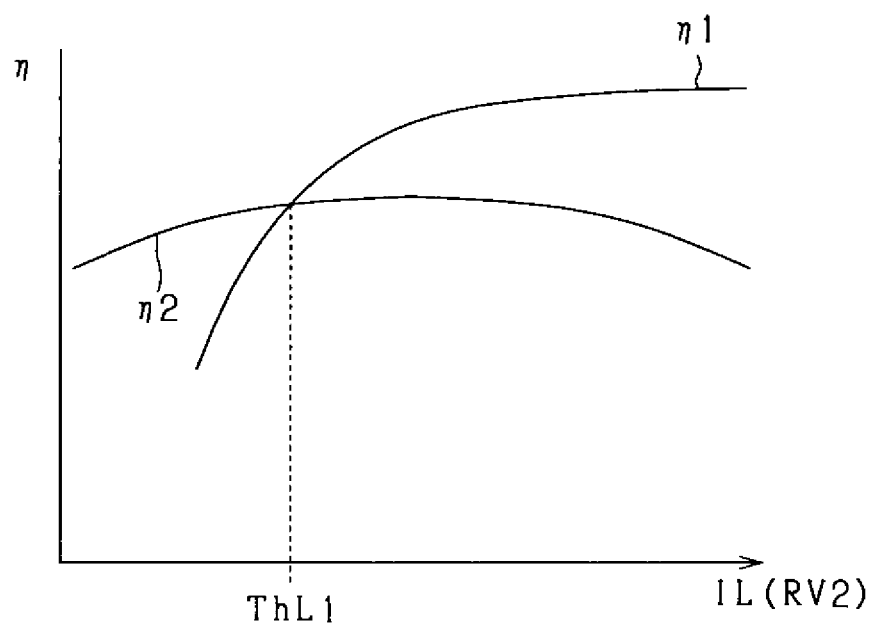
FIG. 21 describes a relationship among a load current IL and first efficiencies $\eta1$, $\eta2$.
FIG. 22 describes sharing amounts.

FIG. 21 describes a relationship among the load current IL and the efficiencies η1, η2 in the second voltage range RV2. In FIG. 21, the horizontal axis represents the load current IL, and the vertical axis represents the efficiency η. Moreover, a boundary for a lower load current range as compared to the rated current of the first DDC 120 is illustrated as a first load threshold ThL1. Hereinafter, the rated current of the first DDC 120 is a first rated current Ir1, and the rated current of the second DDC 130 is a second rated current Ir2.

In the second voltage range RV2, the first efficiency η1 of the first DDC 120 also changes according to the load current IL. The first rated current Ir1 of the first DDC 120 is a value greater than the first load threshold ThL1. Thus, the first efficiency η1 decreases as the load current IL decreases away from the first rated current Ir1. On the other hand, the second rated current Ir2 of the second DDC 130 is a value closer to the first load threshold ThL1 as compared to the first rated current Ir1, and a decrease in the second efficiency η2 in association with a decrease in the load current IL is smaller than a decrease in the first efficiency η1 even in the case of the second rated current Ir2 being equal to or smaller than the first load threshold ThL1. Thus, in a low load current range of equal to or smaller than the first load threshold ThL1, the first efficiency η1 of the first DDC 120 is lower than the second efficiency η2 of the second DDC 130.

FIG. 22 describes the sharing amounts according to the load current IL. In a case where the load current IL is lower than the first load threshold ThL1, the control device 110 sets the sharing amounts of the first and second DDCs 120, 130 such that the load current IL is supplied only with the second output current Iout2. On the other hand, in a case where the load current IL is equal to or higher than the first load threshold ThL1, the control device 110 sets the sharing amounts of the first and second DDCs 120, 130 such that the load current IL is supplied only with the first output current Iout1.

Returning to description of FIG. 20, the load current IL is compared with the first load threshold ThL1 at step S114. At step S114, when it is determined that the load current IL is lower than the first load threshold ThL1, the processing proceeds to step S115. At step S115, the load current IL acquired at step S112 is set as the second output current Iout2 as the sharing amount of the second DDC 130.

At step S116, the first output current Iout1 as the sharing amount of the first DDC 120 is set to zero such that no current is supplied from the first DDC 120 to the equipment group 160. That is, in a case where the load current IL is lower than the first load threshold ThL1, the load current IL is supplied only by the second DDC 130, and no load current IL is supplied by the first DDC 120.

On the other hand, when it is, at step S114, determined that the load current IL is equal to or higher than the first load threshold ThL1, the processing proceeds to step S117. At step S117, the load current IL acquired at step S112 is set as the first output current Iout1.

At step S118, the second output current Iout2 is set to zero such that no load current IL is supplied from the second DDC 130 to the equipment group 160. That is, in a case where the load current IL is equal to or higher than the first load threshold ThL1, the load current IL is supplied only by the first DDC 120, and no load current IL is supplied by the second DDC 130.

At step S113, when it is determined that the first terminal voltage Vb1 is not in the second voltage range RV2, the processing proceeds to step S119. In this case, the first terminal voltage Vb1 is in each of the voltage ranges RV1, RV3, and therefore, the second DDC 130 is preferentially operated because the efficiency of the control system 100 becomes higher. Thus, at step S119, the sharing amounts are set such that the load current IL is supplied only with the second output current Iout2. Specifically, the first output current Iout1 is set to zero, and the second output current Iout2 is set to the load current IL.

At step S120, the first output voltage command value V1* is set according to the first output current Iout1 set at step S116, S117, or S119. For example, a deviation ΔI1 between the first output current Iout1 set at each step S116, S117, or S119 and the first output current Iout1 estimated according to the first current IH1 is calculated. Then, according to the calculated deviation ΔI1, the first output voltage command value V1* is set. Specifically, proportional-integral control is performed with the deviation ΔI1 being taken as an input value and a correction value of the supervisory voltage command value VP being taken as an output value. The supervisory voltage command value VP is corrected using the calculated correction value, and the corrected supervisory voltage command value VP is set as the first output voltage command value V1*.

At step S121, the second output voltage command value V2* is set according to the second output current Iout2 set at step S115, S118, or S119. For example, a deviation ΔI2 between the second output current Iout2 set at each step S115, S118, or S119 and the second output current Iout2 estimated according to the second current IH2 is calculated. Then, according to the calculated deviation ΔI2, the second output voltage command value V2* is set. Specifically, proportional-integral control is performed with the deviation ΔI2 being taken as an input value and a correction value of the supervisory voltage command value VP being taken as an output value. The supervisory voltage command value VP is corrected using the calculated correction value, and the corrected supervisory voltage command value VP is set as the second output voltage command value V2*.

At step S122, the first and second DDCs 120, 130 are operated according to each of the output voltage command values V1*, V2* set at steps S120, S121. Step S122 corresponds to an operation control unit.

According to the present embodiment described above, the following advantageous effects are exhibited.

The control device 110 sets, based on the first terminal voltage Vb1 and the load current IL, the sharing amounts of the load current IL in the first and second DDCs 120, 130. Moreover, based on the set sharing amounts, the first and second DDCs 120, 130 are operated. In this case, each of the output currents Iout1, Iout2 is set considering each of the efficiencies η1, η2 of the first and second DDCs 120, 130, and therefore, fluctuation in the first terminal voltage Vb1 can be handled without sacrificing the efficiency of the entirety of the control system 100.

In a case where the first terminal voltage Vb1 is in the second voltage range RV2, the control device 110 sets the first output current Iout1 more than the second output current Iout2. Moreover, in a case where the first terminal voltage Vb1 is in the first voltage range RV1 or the third voltage range RV3, the control device 110 sets the second output current Iout2 more than the first output current Iout1. With the above-described configuration, even in a case where the first terminal voltage Vb1 fluctuates, the output current Iout1, Iout2 of a higher-efficiency one of the DDCs 20, 30 is more than the output current Iout1, Iout2 of a lower-efficiency one of the DDCs 30. Thus, the efficiency of the entirety of the control system 100 can be enhanced.

A change in the second efficiency η2 of the second DDC 130 when the first terminal voltage Vb1 changes from the second voltage range RV2 to the first voltage range RV1 or the third voltage range RV3 is smaller than a change in the first efficiency η1 of the first DDC 120. With the above-described configuration, in a case where the first terminal voltage Vb1 is in the second voltage range RV2, even if the control device 110 operates the second DDC 130 in an auxiliary manner for the first DDC 120, the second efficiency η2 does not greatly decrease. As a result, a decrease in the efficiency of the entirety of the control system 100 can be suppressed.

In a case where the first terminal voltage Vb1 is not in the second voltage range RV2, the control device 110 does not operate the first DDC 120. With the above-described configuration, the first DDC 120 is not operated in a range in which the efficiency is low so that a decrease in the efficiency of the entirety of the control system 100 can be suppressed.

In a case where the first terminal voltage Vb1 is in the second voltage range RV2 and the load current IL is in the low load current range, the control device 110 sets each of the output currents Iout1, Iout2 such that the load current IL is supplied only with the second output current Iout2. Thus, in the low load current range, the first DDC 120 is not operated, and a decrease in the efficiency of the entirety of the control system 100 can be suppressed.

Fourth Embodiment

In a fourth embodiment, configurations different from those of the third embodiment will be mainly described.

Figures 23, 24:
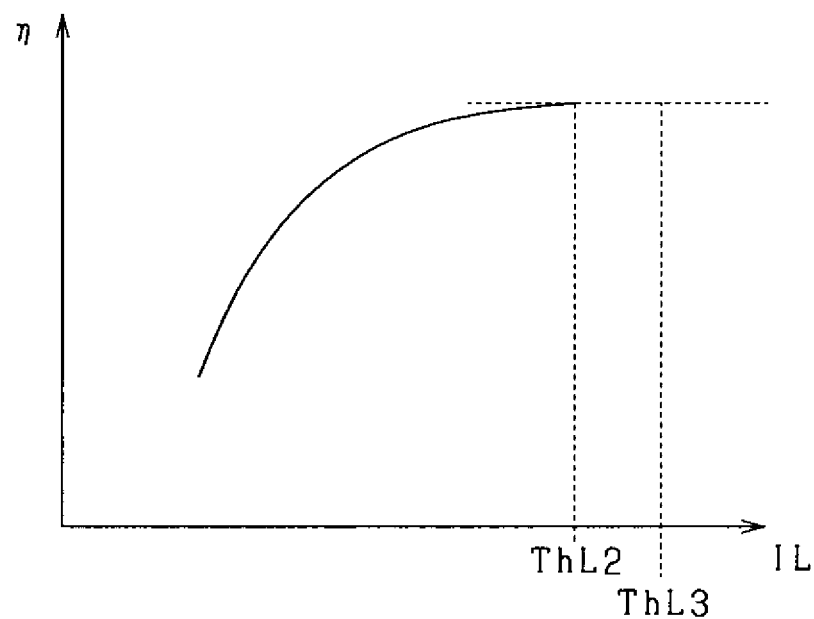
FIG. 23 describes a relationship between a load current IL and an efficiency according to a fourth embodiment.
FIG. 24 describes sharing amounts.

FIG. 23 describes a relationship between a load current IL and an efficiency η according to the fourth embodiment. Even in a case where a first DDC 120 is preferentially operated in a second voltage range RV2, the load current IL might be a value greater than a first rated current Ir1 of the first DDC 120 in some cases. In FIG. 23, a second load threshold ThL2 is a value indicating the first rated current Ir1. Moreover, a third load threshold ThL3 is the maximum value of the load current IL required for an equipment group 160, and is a value greater than the second load threshold ThL2. As illustrated in FIG. 23, when the load current IL is a value of greater than the second load threshold ThL2 and equal to or smaller than the third load threshold ThL3, the load current IL cannot be supplied only by the first DDC 120 in some cases.

FIG. 24 describes sharing amounts of the load current IL according to the fourth embodiment. In the present embodiment, the rated currents of the first and second DDCs 120, 130 have the same value (e.g., 75 A). In a case where the load current IL is lower than the second load threshold ThL2, a control device 110 supplies the load current IL only by means of the first DDC 110. In a case where the load current IL is equal to or higher than the second load threshold ThL2, the control device 110 preferentially operates the first DDC 120, and operates the second DDC 130 in an auxiliary manner for the first DDC 120. This prevents lack of the load current IL.

Figure 25:
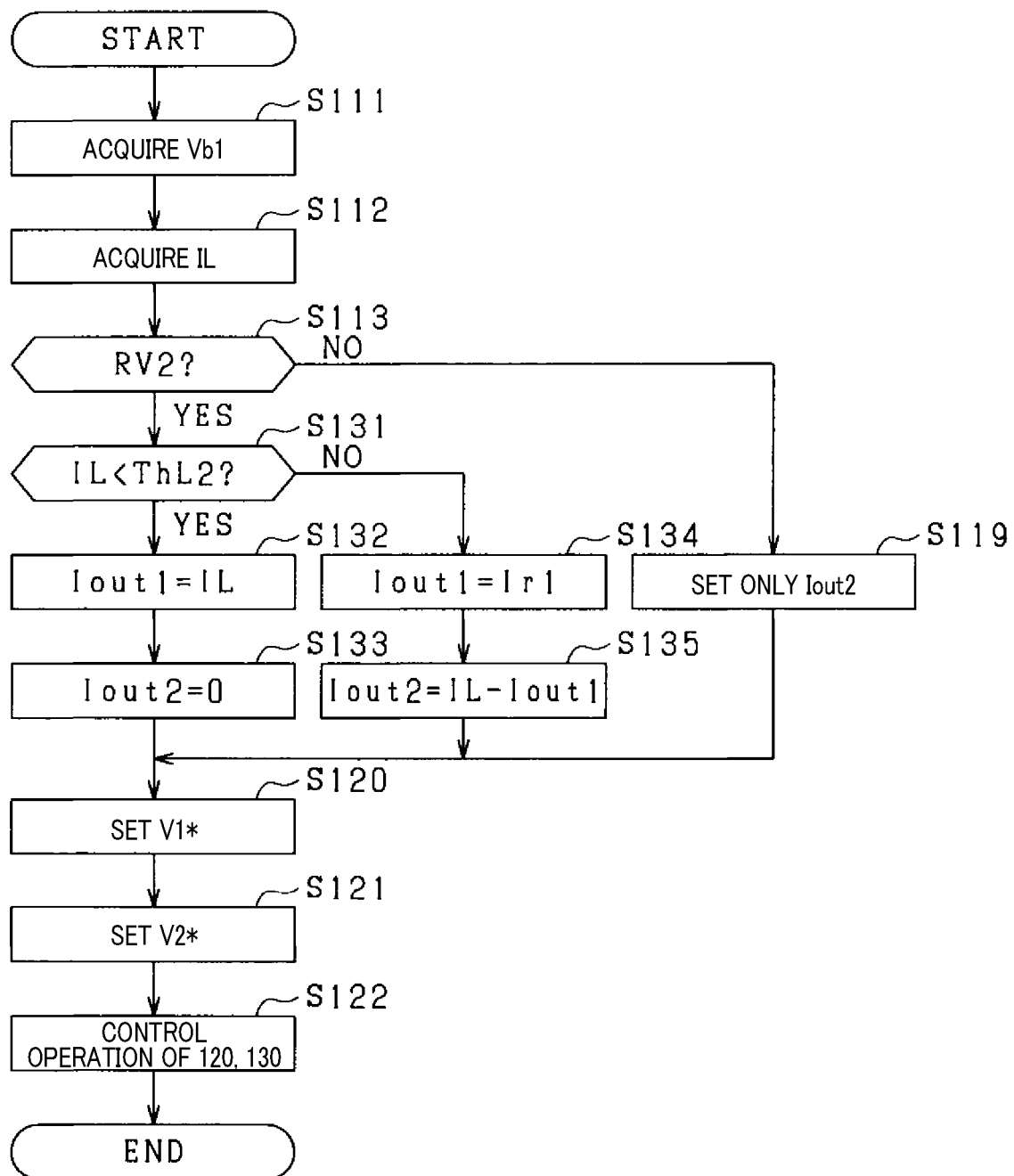
FIG. 25 is a flowchart for describing sharing amount setting processing.

FIG. 25 is a flowchart for describing the processing of setting the sharing amounts of the first and second DDCs 120, 130. The processing illustrated in the flowchart of FIG. 25 is repeatedly performed in a predetermined control cycle by the control device 110.

At step S131, the load current IL and the second load threshold ThL2 are compared with each other. At step S131, when it is determined that the load current IL is lower than the second load threshold ThL2, the processing proceeds to step S132.

At step S132, the load current IL acquired at step S112 is set as a first output current Iout1. At step S133, a second output current Iout2 is set to zero such that no load current IL is supplied from the second DDC 20 to the equipment group 160.

At step S131, when it is determined that the load current IL is equal to or higher than the second load threshold ThL2, the processing proceeds to step S134. At step S134, the first output current Iout1 is set within a range not exceeding the first rated current Ir1. In the present embodiment, the first rated current Ir1 is set to the first output current Iout1.

At step S135, a value obtained by subtraction of the first output current Iout1 set at step S134 from the load current IL is set as the second output current Iout2.

At step S120, a first output voltage command value V1* is set according to the first output current Iout1 set at steps S132, S134, and S119. At step S121, a second output voltage command value V2* is set according to the second output current Iout2 set at steps S133, S135, and S119.

In the above-described present embodiment, the following advantageous effects are exhibited.

The control device 110 sets the sharing amounts of the load current IL not to exceed the rated currents Ir1, Ir2 of the first and second DDCs 120, 130. Thus, the first and second DDCs 120, 130 can be operated with proper output currents Iout1, Iout2.

Fifth Embodiment

In a fifth embodiment, configurations different from those of the third embodiment will be mainly described.

FIG. 26 describes sharing amounts of a load current IL according to the fifth embodiment. In the present embodiment, rated currents are different from each other, and the rated current of a first DDC 120 is 120 A and the rated current of a second DDC 130 is 30 A. Moreover, the maximum value of the load current IL is greater than each of the rated currents Ir1, Ir2 of the first and second DDCs 120, 130, and is equal to or smaller than the sum of the rated currents Ir1, Ir2 of the first and second DDCs 120, 130. In the present embodiment, the maximum value of the load current IL is the sum (e.g., 150 A) of a first rated current Ir1 and a second rated current Ir2.

In a case where the load current IL is lower than a first load threshold ThL1, a control device 110 supplies the load current IL only by the second DDC 130. On the other hand, in a case where the load current IL is equal to or higher than the first load threshold ThL1 and is lower than a third load threshold ThL3, the control device 110 supplies the load current IL only by the first DDC 120. In a maximum load area in which the load current IL is equal to or higher than the third load threshold ThL3, the first and second DDCs 120, 130 are operated together.

Figure 27:
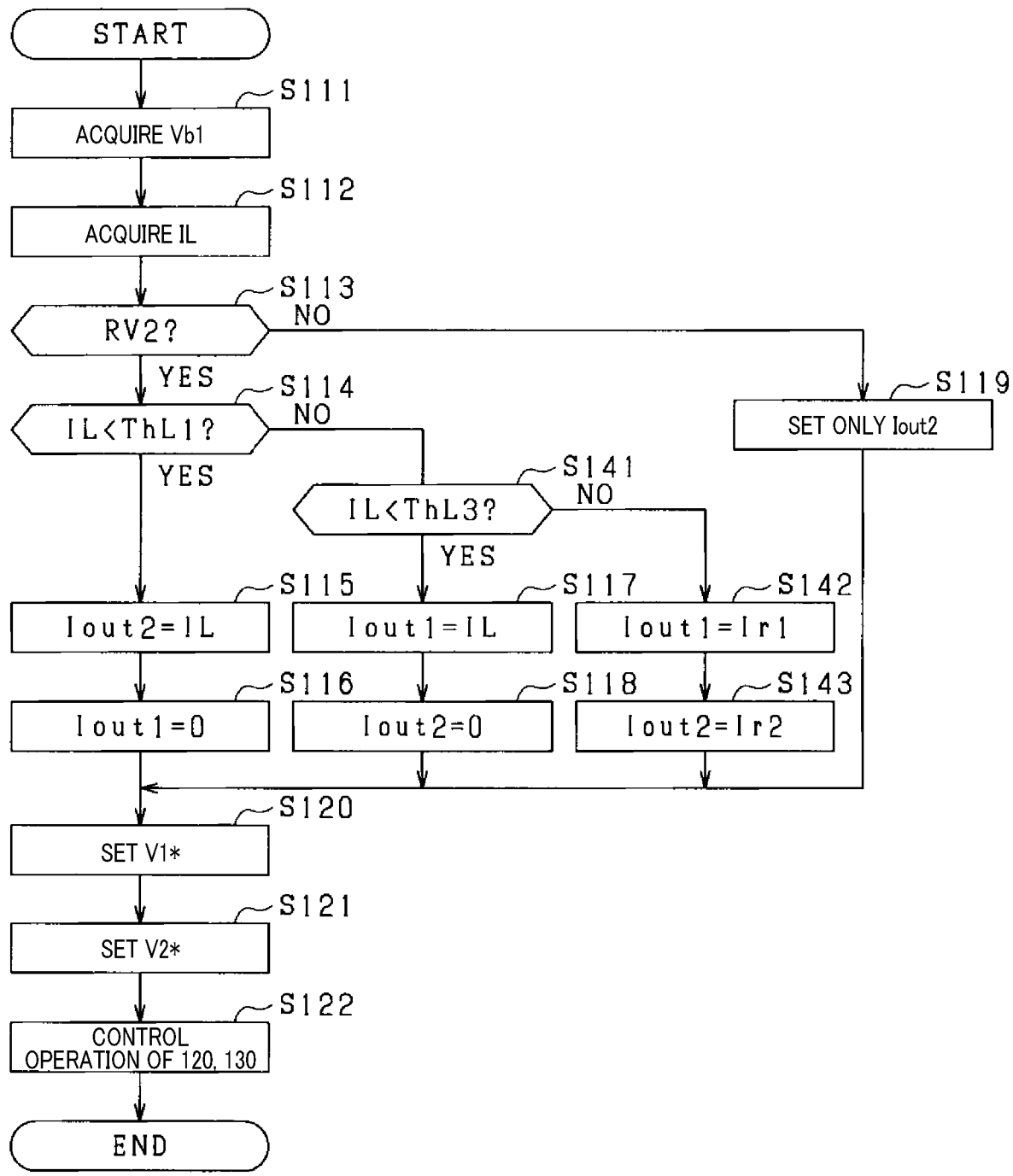
FIG. 27 is a flowchart for describing sharing amount setting processing.

FIG. 27 is a flowchart for describing the processing of setting the sharing amounts of the first and second DDCs 120, 130 according to the fifth embodiment. The processing illustrated in the flowchart of FIG. 27 is repeatedly performed in a predetermined control cycle by the control device 110.

At step S114, when the load current IL is equal to or higher than the first load threshold ThL1, the processing proceeds to step S141, and comparison with the third load threshold ThL3 indicating the vicinity of the maximum value of the load current IL is made. At step S141, when it is determined that the load current IL is lower than the third load threshold ThL3, the processing proceeds to step S117. Step S141 corresponds to a load determination unit.

On the other hand, at step S141, when it is determined that the load current IL is equal to or higher than the third load threshold ThL3, the processing proceeds to step S142. At step S142, a first output current Iout1 is set as the first rated current Ir1. At step S143, a second output current Iout2 is set as the second rated current Ir1.

At step S120, a first output voltage command value V1* is set according to the set first output current Iout1. At step S121, a second output voltage command value V2* is set according to the set second output current Iout2.

According to the above-described present embodiment, the following advantageous effects are exhibited.

At around the maximum value of the load current IL, the control device 110 causes the first and second DDCs 120, 130 to supply the rated currents Ir1, Ir1. Thus, the first rated current Ir1 can be decreased as compared to the maximum value of the load current IL. Thus, an increase in the output capacity of the first DDC 120 can be suppressed, and a size can be reduced. Thus, a cost for a control system 100 can be reduced.

Sixth Embodiment

In a sixth embodiment, configurations different from those of the third embodiment will be mainly described.

In a case where a load current IL is supplied in a state in which operation of a second DDC 130 is stopped, a predetermined time is required until supply of the load current IL begins. For this reason, when the second DDC 130 is operated in an auxiliary manner after a sharing amount of a first DDC 120 has exceeded a first rated current Ir1, there is a probability that supply of a second output current Iout2 by the second DDC 130 is delayed with respect to an increase in the load current IL. For this reason, a control device 110 provides an upper limit such that the percentage of a first output current Iout1 with respect to the load current IL is not a high value. In a case where the load current IL becomes equal to or higher than the upper limit, the sharing amounts of the first and second DDCs 120, 130 are set.

Figure 28:
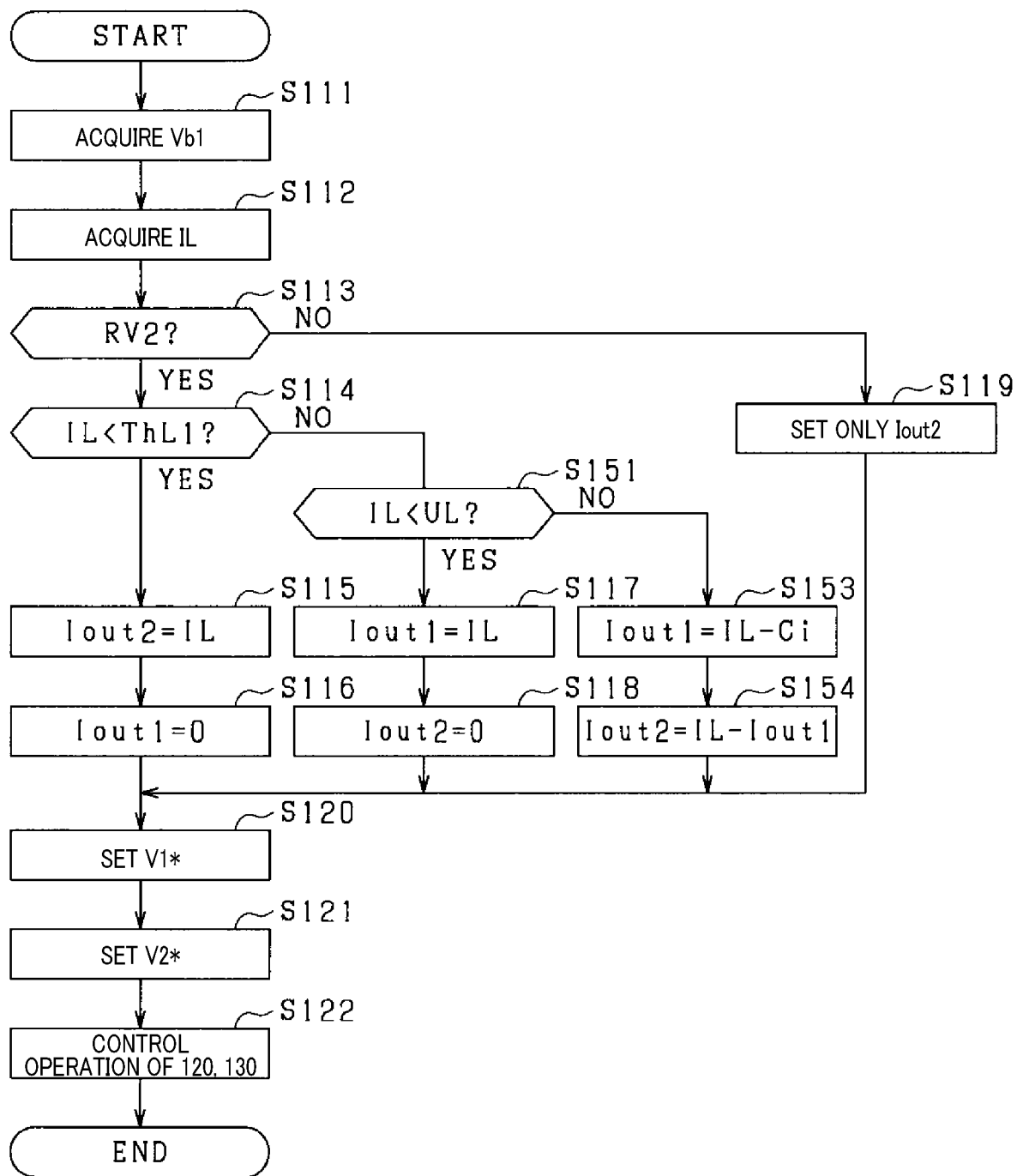
FIG. 28 is a flowchart for describing sharing amount setting processing according to a sixth embodiment.

FIG. 28 is a flowchart for describing the processing of setting the sharing amounts of the first and second DDCs 120, 130 according to the sixth embodiment. The processing illustrated in the flowchart of FIG. 28 is repeatedly performed in a predetermined control cycle by the control device 110.

At step S114, when it is determined that the load current IL is equal to or higher than a first load threshold ThL1, the processing proceeds to step S151. At step S151, the load current IL and an upper limit threshold UL are compared with each other. The upper limit threshold UL indicates a value smaller than the first rated current Ir1. In a case where the load current IL is lower than the upper limit threshold UL, the processing proceeds to step S117. Step S151 corresponds to an upper limit determination unit.

At step S117, the load current IL is set as the first output current Iout1. Then, at step S118, the second output current Iout2 is set to zero.

On the other hand, when it is determined that the load current IL is higher than the upper limit threshold UL, the processing proceeds to step S153. At steps S153, S154, the sharing amount of the second DDC 130 is set such that the sharing amount of the first DDC 120 set according to an increase in the load current IL does not exceed the first rated current Ir1. For example, at step S153, a value obtained by subtraction of a current correction value Ci from the first rated current Ir1 is set as the first output current Iout1. The current correction value Ci is a value changing according to the load current IL acquired at step S112. At step S154, a value obtained by subtraction of the first output current Iout1 set at step S154 from the load current IL is set as the second output current Iout2.

At step S120, a first output voltage command value V1* is set according to the set first output current Iout1. At step S121, a second output voltage command value V2* is set according to the set second output current Iout2.

According to the above-described present embodiment, the following advantageous effects are exhibited.

When it is determined that the load current IL is lower than the upper limit threshold UL indicating the value smaller than the first rated current Ir1, the control device 110 operates only the first DDC 120. When it is determined that the load current IL is equal to or higher than the upper limit threshold UL, the control device 110 operates the first and second DDCs 120, 130. Thus, the first and second DDCs 120, 130 are operated together in a state in which the load current IL is lower than the first rated current Ir1, and therefore, delay of supply of the second output current Iout2 by the second DDC 130 with respect to a sudden increase in the load current IL can be prevented.

Modification of Sixth Embodiment

The percentage of the first output current Iout1 with respect to the first rated current Ir1 may be calculated. In a case where this percentage exceeds an upper limit at step S151, the first and second DDCs 120, 130 may be operated together.

Seventh Embodiment

In a seventh embodiment, configurations different from those of the third embodiment will be mainly described.

In the present embodiment, at step S119, in a case where a second DDC 130 is preferentially operated, a first DDC 120 is operated in an auxiliary manner for the second DDC 130 according to a load current IL.

Figure 29:
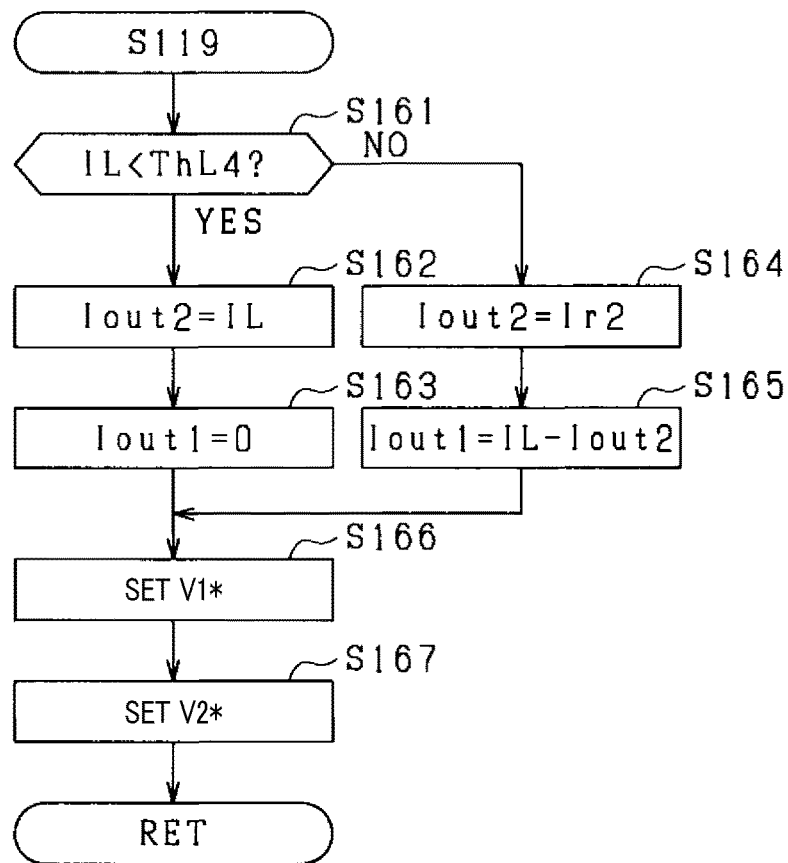
FIG. 29 is a flowchart for describing processing performed by a control device at step S191.

FIG. 29 is a flowchart for describing processing performed by a control device 110 at step S119 of FIG. 20. At step S161, the load current IL is compared with a fourth load threshold ThL4. The fourth load threshold ThL4 is a value indicating a second rated current Ir1 of the second DDC 20.

At step S161, in a case where the load current IL is lower than the fourth load threshold ThL4, the load current IL can be supplied only by the second DDC 130. Thus, at step S162, the load current IL is set as a second output current Iout2. At step S163, a first output current Iout1 is set to zero such that no load current IL is supplied from the first DDC 120.

On the other hand, at step S161, when the load current IL is equal to or higher than the fourth load threshold ThL4, the load current IL cannot be supplied only by the second DDC 130. Thus, at step S164, the second rated current Ir2 is set as a second output current Iout2.

At step S165, a value obtained by subtraction of the second output current Iout2 set at step S164 from the load current IL is set as the first output current Iout1.

At step S166, a second output voltage command value V2* is set according to the second output current Iout2 set at step S163, or S165. At step S167, a first output voltage command value V1* is set according to the first output current Iout1 set at step S162, or S164.

According to the above-described present embodiment, the following advantageous effects are exhibited.

Even in a case where a first terminal voltage Vb1 is outside a second voltage range RV2, the control device 110 prevents the second output current Iout2 of the second DDC 130 from being equal to or higher than the second rated current Ir2. Thus, the first and second DDCs 120, 130 can be properly operated.

Eighth Embodiment

In an eight embodiment, configurations different from those of the third embodiment will be mainly described.

In the present embodiment, a first DDC 120 and a second DDC 130 are both configured as phase shift converters, but are different from each other in the turn ratio of a transformer. Specifically, in a case where a first terminal voltage Vb1 is in a voltage range in which the first and second DDCs 120, 130 have high efficiencies η1, η2, the turn ratios of the transformers of the first and second DDCs 120, 130 are set such that proper output voltages Vout1, Vout2 are provided. Hereinafter, the turn ratio of the transformer of the first DDC 120 is N1, and the turn ratio of the transformer of the second DDC 130 is N2. In the present embodiment, the turn ratio is set based on the ratio of the number of turns of a primary-side coil to the number of turns of a secondary-side coil. Moreover, the turn ratio N1 of the first DDC 120 is a value smaller than the turn ratio N2 of the second DDC 130.

In a case where the first terminal voltage Vb1 is in a second voltage range RV2, the turn ratio N1 of the transformer of the first DDC 120 is set such that a suitable first output voltage Vout1 is provided. Moreover, in a case where the first terminal voltage Vb1 is in a first voltage range RV1, the turn ratio N2 of the transformer of the second DDC 130 is set such that a suitable second output voltage Vout2 is provided.

In a control system 100 with the above-described configuration, when it is, at step S113, determined that the first terminal voltage Vb1 is in the second voltage range RV2, sharing amounts of the first and second DDCs 120, 130 are set (steps S114 to S118). Moreover, at step S113, when it is determined that the first terminal voltage Vb1 is not in the second voltage range RV2, the sharing amounts of the first and second DDCs 120, 130 are set such that the second DDC 20 is preferentially operated (step S119).

Ninth Embodiment

In a ninth embodiment, configurations different from those of the third embodiment will be mainly described.

Figure 30:
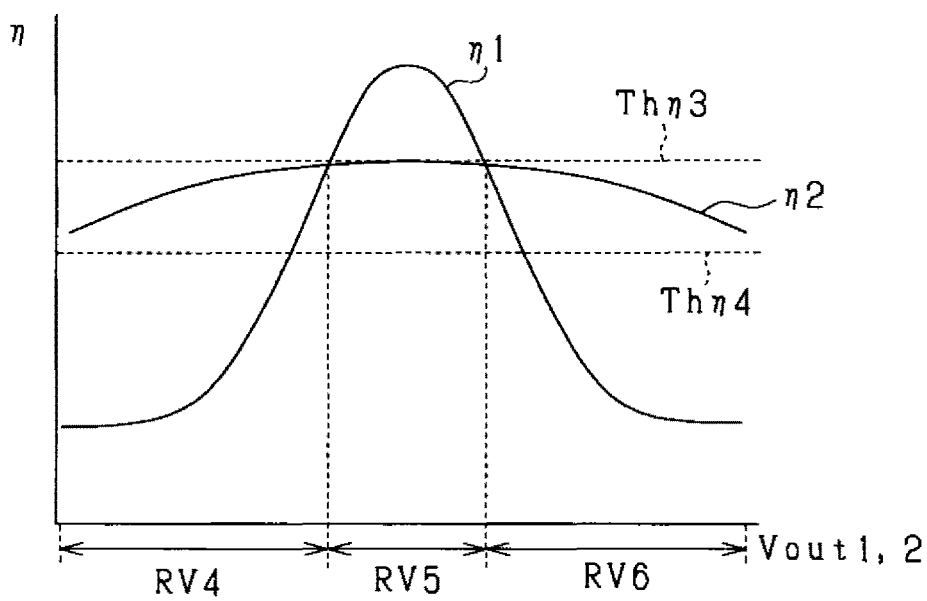
FIG. 30 describes a relationship between an output voltage Vout and an efficiency q.

The efficiencies $\eta1$, $\eta2$ of first and second DDCs 120, 130 also change according to output voltages Vout1, Vout2. FIG. 30 describes a relationship between the output voltage Vout and the efficiency $\eta$. FIG. 30 is a graph in a case where the horizontal axis represents each of the output voltages Vout1, Vout2 and the vertical axis represents the efficiency $\eta$. In the horizontal axis, each of the output voltages Vout1, Vout2 is divided into a fourth voltage range RV4, a fifth voltage range RV5, and a sixth voltage range RV6. A voltage value in the fourth voltage range RV4 is smaller than a third boundary value, and a voltage value in the fifth voltage range RV5 is greater than the third boundary value. Moreover, a voltage value in the fifth voltage range RV5 is smaller than a fourth boundary value, and a voltage value in the sixth voltage range RV6 is greater than the fourth boundary value. The third boundary value is a value smaller than the fourth boundary value. The minimum value of the fourth voltage range RV4 is the lower limit of each of the output voltages Vout1, Vout2 of the first and second DDCs 120, 130, and the maximum value of the sixth voltage range RV6 is the upper limit of each of the output voltages Vout1, Vout2 of the first and second DDCs 120, 130.

The first efficiency $\eta1$ of the first DDC 120 is, in the fifth voltage range RV5, a value greater than the second efficiency $\eta2$ of the second DDC 130. In the fifth voltage range RV5 of FIG. 30, the first efficiency $\eta1$ is a value greater than a third efficiency threshold Th$\eta3$, and the second efficiency $\eta2$ is a value smaller than the third efficiency threshold Th$\eta3$. On the other hand, in the fourth and sixth voltage ranges RV4, RV6, the first efficiency $\eta1$ is a value smaller than the second efficiency $\eta2$.

A change in the second efficiency $\eta2$ in association with a change in each of the output voltages Vout1, Vout2 when each of the output voltages Vout1, Vout2 changes from the fifth voltage range RV5 to the fourth voltage range RV4 or the sixth voltage range RV6 is smaller than a change in the first efficiency $\eta1$. In each of the voltage ranges RV4 to RV6, the first efficiency $\eta1$ of the first DDC 120 fluctuates from a value equal to or greater than the third efficiency threshold Th$\eta3$ to a value equal to or smaller than a fourth efficiency threshold Th$\eta4$. On the other hand, in each of the voltage ranges RV4 to RV6, the second efficiency $\eta2$ fluctuates from a value equal to or greater than the fourth efficiency threshold Th$\eta4$ to a value smaller than the third efficiency threshold Th$\eta3$. The fourth efficiency threshold Th$\eta4$ is a value smaller than the third efficiency threshold Th$\eta3$.

Figure 31:
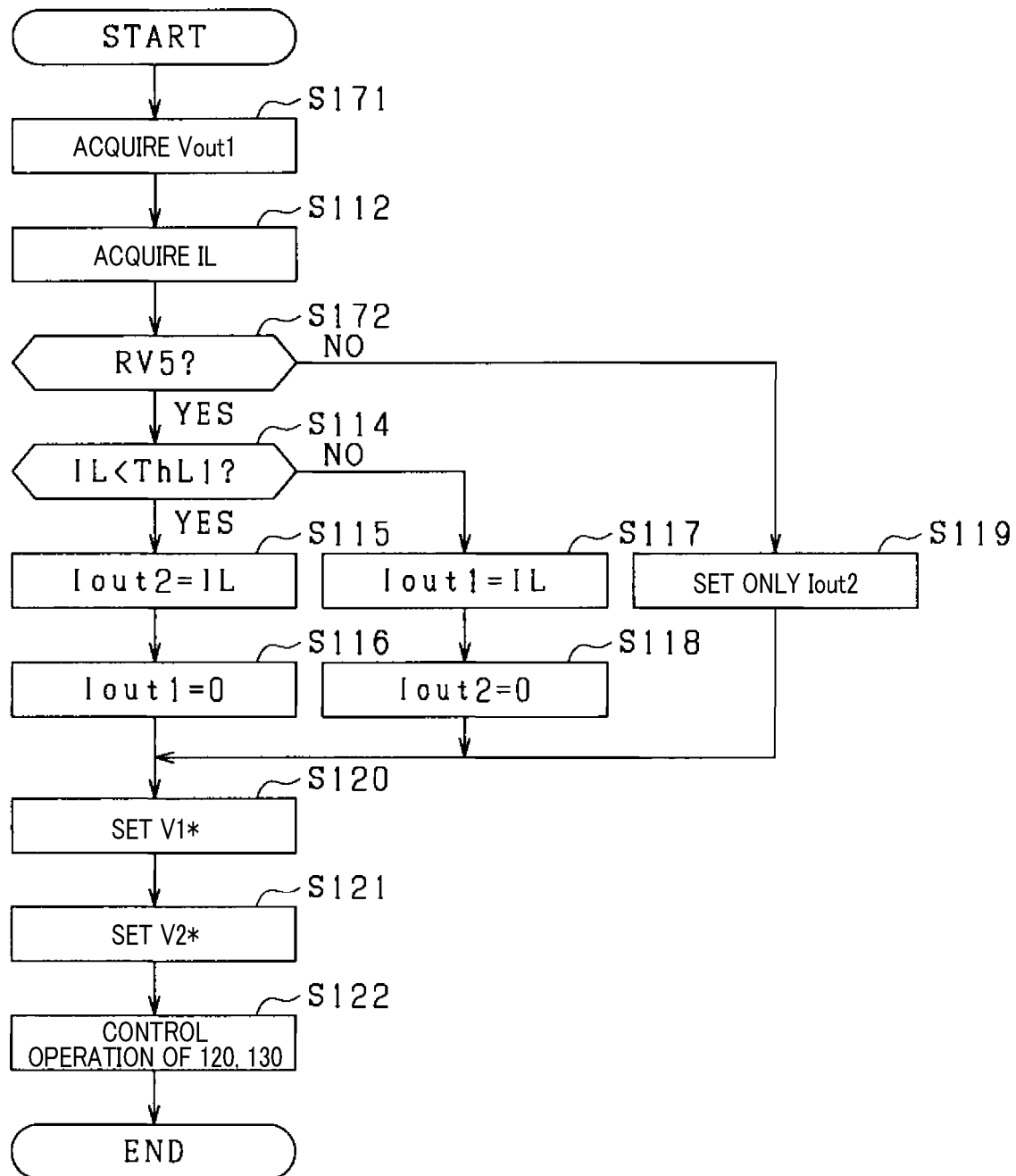
FIG. 31 is a flowchart for describing sharing amount setting processing according to a ninth embodiment.

FIG. 31 is a flowchart for describing the processing of setting sharing amounts of the first and second DDCs 120, 130 according to the ninth embodiment. The processing illustrated in the flowchart of FIG. 31 is repeatedly performed in a predetermined control cycle by a control device 110.

At step S171, the first output voltage Vout1 required for the first DDC 120 is acquired. For example, the first output voltage Vout1 of the first DDC 120 is estimated according to a current first output voltage command value V1*. Note that in a case where the second output voltage Vout2 and the first output voltage Vout1 are the same value, the second output voltage Vout2 may be acquired at step S71.

At step S172, it is determined whether the first output voltage Vout1 acquired at step S171 is in the fifth voltage range RV5 or not. At step S73, when it is determined that the first output voltage Vout1 is in the fifth voltage range RV5, the processing proceeds to step S114. Then, the sharing amount of the first DDC 120 and the sharing amount of the second DDC 130 are set according to a load current IL (steps S115 to S118).

At step S172, when it is determined that the first output voltage Vout1 is not in the fifth voltage range RV5, the processing proceeds to step S119. At step S119, the sharing amounts are set such that the load current IL is supplied by the second DDC 130.

According to the above-described present embodiment, the following advantageous effects are exhibited.

In a case where the first output voltage Vout1 fluctuates, the control device 110 sets the sharing amounts (Iout1, Iout2) of the load current IL, considering the efficiencies $\eta1$, $\eta2$ of the first and second DDCs 120, 130. Thus, fluctuation in the output voltage Vout can be handled without sacrificing the efficiency of the entirety of a control system 100.

Various Modifications of Third to Ninth Embodiments

In a case where the rated currents Ir1, Ir1 of the first and second DDCs 120, 130 are different from each other, the sharing amounts of the first and second DDCs 120, 130 may be set based on a rated current range set based on the first rated current Ir1. In this case, the sharing amount of the first DDC 120 is set more than the sharing amount of the second DDC 130 on condition that the first terminal voltage Vb1 is in the second voltage range RV2 and the load current IL is in the rated current range. On the other hand, in a case where any of a condition where the first terminal voltage Vb1 is not in the second voltage range RV2 and a condition where the load current IL is not in the rated current range is satisfied, the sharing amount of the second DDC 130 is set more than the sharing amount of the first DDC 120.

The first DDC 120 may include a flyback converter, and the second DDC 130 may include a phase shift converter. In this case, the first DDC 120 has a higher efficiency than that of the second DDC 130 in the second voltage range RV2.

The electric storage device is not limited to the storage battery as long as the electric storage device is a device configured to supply DC voltage. For example, a capacitor may be used as the electric storage device.

The first and second DDCs 120, 130 may be those mounted on other devices than the vehicle.

The current sensor may be configured to directly detect the load current IL flowing in the subline SL.

The control system 100 does not necessarily include the second storage battery 155.

Based on the above exemplary described embodiments, following driving systems of the present disclosure are also provided:

(1) A power conversion system control device applied to a power conversion system including a first power conversion device and a second power conversion device connected in parallel with a common power supply target, comprising:

a load output acquisition unit configured to acquire at least any of a load output including a load current or power to be supplied to the power supply target and a voltage parameter including an input voltage or an output voltage of each of the first power conversion device and the second power conversion device; and an operation control unit configured to control operation of the first power conversion device and the second power conversion device based on at least any of the voltage parameter and the load output.

(2) The power conversion system control device according to (1), wherein the second power conversion device has a maximum power conversion efficiency in a first load area, the first power conversion device has a maximum power conversion efficiency in a second load area greater than the first load area, the load output acquisition unit acquires the load output, a load determination unit configured to determine which one of the first load area, the second load area, and a third load area greater than the second load area the load output is in is provided, and the operation control unit operates only the second power conversion device in a case where it is determined that the load output is in the first load area, operates only the first power conversion device in a case where it is determined that the load output is in the second load area, and operates the first power conversion device and the second power conversion device together in a case where it is determined that the load output is in the third load area.

(3) The power conversion system control device according to (2), wherein the load determination unit determines that the load output is in the first load area in a case where the load output is a value equal to or smaller than an output rated value of the second power conversion device.

(4) The power conversion system control device according to (2) or (3), wherein an output rated value of the first power conversion device is set greater than the output rated value of the second power conversion device, and the load determination unit determines that the load output is in the second load area in a case where the load output is a value equal to or greater than the output rated value of the second power conversion device and equal to or smaller than the output rated value of the first power conversion device.

(5) The power conversion system control device according to any one of (2) to (4), further comprising:

a first voltage acquisition unit configured to acquire an output voltage of the first power conversion device as a first output voltage;

a second voltage acquisition unit configured to acquire an output voltage of the second power conversion device as a second output voltage;

a first target current calculation unit configured to calculate, as an operation amount for a control of feeding back the first output voltage to a first voltage command value, a first target current value as a target value of an output current of the first power conversion device;

a second target current calculation unit configured to calculate, as an operation amount for a control of feeding back the second output voltage to a second voltage command value, a second target current value as a target value of an output current of the second power conversion device; and a stop control unit configured to stop operation of the first power conversion device in a case where the first target current value is equal to or smaller than a first predetermined value and stop operation of the second power conversion device in a case where the second target current value is equal to or smaller than a second predetermined value, wherein the first target current calculation unit calculates the first target current value by feedback control including at least one of proportional control or integral control based on a deviation between the first voltage command value and the first output voltage, the second target current calculation unit calculates the second target current value by feedback control including at least one of proportional control or integral control based on a deviation between the second voltage command value and the second output voltage, and the operation control unit sets the first voltage command value to a value smaller than the second voltage command value such that only the second power conversion device is operated in a case where it is determined that the load output is in the first load area, and sets the second voltage command value to a value smaller than the first voltage command value such that only the first power conversion device is operated in a case where it is determined that the load output is in the second load area.

(6) The power conversion system control device according to any one of (2) to (5), wherein in a case where it is determined that the load output is in the third load area, the operation control unit operates the second power conversion device such that the output voltage of the second power conversion device reaches the second voltage command value, and operates the first power conversion device such that the output current of the first power conversion device reaches the output rated value of the first power conversion device.

(7) The power conversion system control device according to (6), further comprising:

the first voltage acquisition unit configured to acquire the output voltage of the first power conversion device as the first output voltage;

the second voltage acquisition unit configured to acquire the output voltage of the second power conversion device as the second output voltage;

the first target current calculation unit configured to calculate, as the operation amount for the control of feeding back the first output voltage to the first voltage command value, the first target current value as the target value of the output current of the first power conversion device;

the second target current calculation unit configured to calculate, as the operation amount for the control of feeding back the second output voltage to the second voltage command value, the second target current value as the target value of the output current of the second power conversion device; and a current value change unit configured to set the operation amount of the second power conversion device to the output rated value of the second power conversion device in a case where the second target current value exceeds the output rated value of the second power conversion device, wherein in a case where it is determined that the load output is in the second load area, the operation control unit sets the second voltage command value greater than the first voltage command value to operate the second power conversion device such that the output current of the second power conversion device reaches the output rated value of the second power conversion device.

(8) The power conversion system control device according to any one of (2) to (7), wherein the load output is the load current, and in a case where the load output is a value greater than the second load area and equal to or smaller than a value obtained by doubling of a rated current of the second power conversion device, the operation control unit performs such operation that an equalized output current is output to the first power conversion device and the second power conversion device.

(9) The power conversion system control device according to (1), wherein
the first power conversion device is a first DC/DC converter configured to drop an input voltage from an electric storage device,
the second power conversion device is a second DC/DC converter configured to drop the input voltage from the electric storage device,
the load output acquisition unit acquires the load current as the load output and the voltage parameter,
a sharing setting unit configured to set load current sharing amounts of the first DC/DC converter and the second DC/DC converter based on the voltage parameter and the load current is provided, and
the operation control unit controls, based on the sharing amounts, operation of the first DC/DC converter and the second DC/DC converter.

(10) The power conversion system control device according to (9), wherein
the first DC/DC converter has a higher efficiency than that of the second DC/DC converter in a first range as a voltage parameter range, and the second DC/DC converter has a higher efficiency than that of the first DC/DC converter in a second range different from the first range,
the sharing setting unit sets the sharing amount of the first DC/DC converter to be more than the sharing amount of the second DC/DC converter in a case where the voltage parameter is in the first range, and sets the sharing amount of the second DC/DC converter more than the sharing amount of the first DC/DC converter in a case where the voltage parameter is in the second range.

(11) The power conversion system control device according to (10), wherein
a change in the efficiency of the second DC/DC converter when the voltage parameter changes from the second range to the first range is smaller than a change in the efficiency of the first DC/DC converter.

(12) The power conversion system control device according to (10) or (11), wherein
in a case where the voltage parameter is in the second range, the sharing setting unit does not operate the first DC/DC converter.

(13) The power conversion system control device according to any one of (10) to (12), wherein
in a case where the load current lower than a predetermined load threshold is output, the first DC/DC converter has a lower efficiency than that of the second DC/DC converter, and
in a case where the voltage parameter is in the first range and the load current is lower than the load threshold, the sharing setting unit does not operate the first DC/DC converter.

(14) The power conversion system control device according to any one of (9) to (13), further comprising:
an upper limit determination unit configured to determine whether the load current is lower than an upper limit smaller than a rated current of the first DC/DC converter,
wherein the sharing setting unit does not operate the second DC/DC converter in a case where the upper limit determination unit determines that the load current is lower than the upper limit, and sets the sharing amounts of the first DC/DC converter and the second DC/DC converter to operate the first DC/DC converter and the second DC/DC converter in a case where it is determined that the load current is equal to or higher than the upper limit.

(15) The power conversion system control device according to any one of (9) to (13), wherein
the sharing setting unit sets the sharing amounts of the first DC/DC converter and the second DC/DC converter not to exceed the rated currents thereof.

(16) A control system comprising:
the control device according to any one of (9) to (15); and
the power conversion system.

The present disclosure has been described in accordance with the embodiments, but it is understood that the present disclosure is not limited to these embodiments and structures. The present disclosure also includes various modifications and modifications in the scope of equivalents. In addition, not only various combinations and forms but also other combinations and forms including more, less, or a single element are also within the scope and sprit of the present disclosure.

What is claimed is:

1. A control device comprising a first DC/DC converter and a second DC/DC converter and applied to a power conversion system that provides an output voltage with a common power supply target from the first DC/DC converter and the second DC/DC converter, the first DC/DC converter and the second DC/DC converter being configured to drop an input voltage from an electric storage device, and the control device comprising:
a voltage acquisition unit configured to acquire an input voltage or an output voltage as a voltage parameter;
a current acquisition unit configured to acquire a load current supplied to the common power supply target;
a sharing setting unit configured to set sharing amounts of the load current of the first DC/DC converter and the second DC/DC converter based on the voltage parameter and the load current; and
an operation control unit that controls, based on the sharing amounts, operation of the first DC/DC converter and the second DC/DC converter, wherein
the first DC/DC converter has a higher efficiency than that of the second DC/DC converter in a first range as a voltage parameter range, and the second DC/DC converter has a higher efficiency than that of the first DC/DC converter in a second range different from the first range,
the sharing setting unit sets the sharing amount of the first DC/DC converter to be more than the sharing amount of the second DC/DC converter in a case where the voltage parameter is in the first range, and sets the sharing amount of the second DC/DC converter to be more than the sharing amount of the first DC/DC converter in a case where the voltage parameter is in the second range,
in a case where the first DC/DC converter outputs the load current lower than a predetermined load threshold, the first DC/DC converter has a lower efficiency than that of the second DC/DC converter, and
in a case where the voltage parameter is in the first range and the load current is lower than the predetermined load threshold, the sharing setting unit sets the sharing amounts for the operation control unit not to operate the first DC/DC converter.

2. The control device according to claim 1, further comprising:
an upper limit determination unit configured to determine whether the load current is lower than an upper limit, the upper limit being smaller than a rated current of the first DC/DC converter,
wherein the sharing setting unit sets the sharing amount for the operation control unit not to operate the second DC/DC converter in a case where the upper limit determination unit determines that the load current is lower than the upper limit, and sets the sharing amounts of the first DC/DC converter and the second DC/DC converter to operate the first DC/DC converter and the second DC/DC converter in a case where it is determined that the load current is equal to or higher than the upper limit.

3. The control device according to claim 1, wherein a change in the efficiency of the second DC/DC converter when the voltage parameter changes from the second range to the first range is smaller than a change in the efficiency of the first DC/DC converter.

4. The control device according to claim 1, wherein in a case where the voltage parameter is in the second range, the sharing setting unit sets the sharing amount for the operation control unit not to operate the first DC/DC converter.

5. The control device according to claim 1, wherein the sharing setting unit sets the sharing amounts of the first DC/DC converter and the second DC/DC converter not to exceed the rated currents thereof.

6. A control system comprising:
an electric storage device;
a control device comprising a first DC/DC converter and a second DC/DC converter and applied to a power conversion system that provides an output voltage with a common power supply target from the first DC/DC converter and the second DC/DC converter, the first DC/DC converter and the second DC/DC converter being configured to drop an input voltage from the electric storage device, and the control device comprising:
a voltage acquisition unit configured to acquire an input voltage or an output voltage as a voltage parameter;
a current acquisition unit configured to acquire a load current supplied to the common power supply target;
a sharing setting unit configured to set sharing amounts of the load current of the first DC/DC converter and the second DC/DC converter based on the voltage parameter and the load current; and
an operation control unit that controls, based on the sharing amounts, operation of the first DC/DC converter and the second DC/DC converter, wherein
the first DC/DC converter has a higher efficiency than that of the second DC/DC converter in a first range as a voltage parameter range, and the second DC/DC converter has a higher efficiency than that of the first DC/DC converter in a second range different from the first range,
the sharing setting unit sets the sharing amount of the first DC/DC converter to be more than the sharing amount of the second DC/DC converter in a case where the voltage parameter is in the first range, and sets the sharing amount of the second DC/DC converter to be more than the sharing amount of the first DC/DC converter in a case where the voltage parameter is in the second range,
in a case where the first DC/DC converter outputs the load current lower than a predetermined load threshold, the first DC/DC converter has a lower efficiency than that of the second DC/DC converter, and
in a case where the voltage parameter is in the first range and the load current is lower than the predetermined load threshold, the sharing setting unit sets the sharing amounts for the operation control unit not to operate the first DC/DC converter.

7. A control device comprising a first DC/DC converter and a second DC/DC converter and applied to a power conversion system that provides an output voltage with a common power supply target from the first DC/DC converter and the second DC/DC converter, the first DC/DC converter and the second DC/DC converter being configured to drop an input voltage from an electric storage device, and the control device comprising:
a voltage acquisition unit configured to acquire an input voltage or an output voltage as a voltage parameter;
a current acquisition unit configured to acquire a load current supplied to the common power supply target;
a sharing setting unit configured to set sharing amounts of the load current of the first DC/DC converter and the second DC/DC converter based on the voltage parameter and the load current,
an upper limit determination unit configured to determine whether the load current is lower than an upper limit, the upper limit being smaller than a rated current of the first DC/DC converter; and
an operation control unit that controls, based on the sharing amounts, operation of the first DC/DC converter and the second DC/DC converter, wherein
the first DC/DC converter has a higher efficiency than that of the second DC/DC converter in a first range as a voltage parameter range, and the second DC/DC converter has a higher efficiency than that of the first DC/DC converter in a second range different from the first range,
the sharing setting unit sets the sharing amount of the first DC/DC converter to be more than the sharing amount of the second DC/DC converter in a case where the voltage parameter is in the first range, and sets the sharing amount of the second DC/DC converter to be more than the sharing amount of the first DC/DC converter in a case where the voltage parameter is in the second range, and
the sharing setting unit sets the sharing amount for the operation control unit not to operate the second DC/DC converter in a case where the upper limit determination unit determines that the load current is lower than the upper limit, and sets the sharing amounts of the first DC/DC converter and the second DC/DC converter to operate the first DC/DC converter and the second DC/DC converter in a case where it is determined that the load current is equal to or higher than the upper limit.

* * * * *